(12) United States Patent
Okuda et al.

(10) Patent No.: US 12,016,823 B2
(45) Date of Patent: Jun. 25, 2024

(54) PHARMACEUTICAL MANAGEMENT SYSTEM

(71) Applicant: PHC HOLDINGS CORPORATION, Tokyo (JP)

(72) Inventors: Akinobu Okuda, Nara (JP); Hideyuki Morii, Ehime (JP); Susumu Takagi, Ehime (JP)

(73) Assignee: PHC HOLDINGS CORPORATION, Tokyo (JP)

( * ) Notice: Subject to any disclaimer, the term of this patent is extended or adjusted under 35 U.S.C. 154(b) by 612 days.

(21) Appl. No.: 17/170,569

(22) Filed: Feb. 8, 2021

(65) Prior Publication Data
US 2021/0161766 A1 Jun. 3, 2021

Related U.S. Application Data

(63) Continuation of application No. PCT/JP2019/023421, filed on Jun. 13, 2019.

(30) Foreign Application Priority Data
Aug. 10, 2018 (JP) .................................. 2018-151306

(51) Int. Cl.
F25D 11/00 (2006.01)
A61J 1/16 (2023.01)

(52) U.S. Cl.
CPC ............ *A61J 1/165* (2013.01); *A61J 2200/40* (2013.01); *A61J 2205/60* (2013.01)

(58) Field of Classification Search
CPC ..... A61J 1/165; A61J 2200/40; A61J 2205/60
USPC .......................................................... 62/440
See application file for complete search history.

(56) References Cited

U.S. PATENT DOCUMENTS

| | | | |
|---|---|---|---|
| 2005/0158151 A1 | 7/2005 | Kawasaki et al. | |
| 2006/0028392 A1 | 2/2006 | Coveley | |
| 2007/0272746 A1 | 11/2007 | Ortiz et al. | |
| 2010/0300130 A1* | 12/2010 | Shoenfeld | F25D 29/00 62/236 |
| 2014/0244289 A1 | 8/2014 | Lowenstein | |
| 2018/0114180 A1 | 4/2018 | Uno et al. | |

FOREIGN PATENT DOCUMENTS

| | | | |
|---|---|---|---|
| CN | 107560273 A | * | 1/2018 |
| EP | 1 049 042 A1 | | 11/2000 |
| EP | 1 174 667 A1 | | 1/2002 |
| EP | 3 291 154 A1 | | 3/2018 |

(Continued)

OTHER PUBLICATIONS

European Office Action issued in the corresponding European Patent Application No. 19848618.5, dated Jun. 3, 2022.

(Continued)

*Primary Examiner* — Davis D Hwu
(74) *Attorney, Agent, or Firm* — Rimon P.C.

(57) ABSTRACT

A pharmaceutical management system includes: an IC tag attached to a pharmaceutical; a pharmaceutical storage box to store the pharmaceutical and read information of the IC tag; a controller to acquire the information of the IC tag from the pharmaceutical storage box and manage the pharmaceutical; and a pharmaceutical refrigerator to store the pharmaceutical storage box to refrigerate the pharmaceutical.

6 Claims, 26 Drawing Sheets

(56) References Cited

FOREIGN PATENT DOCUMENTS

| JP | 2000-105149 A | | 4/2000 |
|---|---|---|---|
| JP | 2002-154617 A | | 5/2002 |
| JP | 2005-206279 A | | 8/2005 |
| JP | 2005-236705 A | | 9/2005 |
| JP | 2005-306574 A | | 11/2005 |
| JP | 2007111152 A | * | 5/2007 |
| JP | 2007-326653 A | | 12/2007 |
| JP | 2016-172605 A | | 9/2016 |
| JP | 2016-201085 A | | 12/2016 |
| JP | 2017-027345 A | | 2/2017 |
| WO | WO2007084866 A2 | * | 7/2007 |

OTHER PUBLICATIONS

International Search Report issued in International Patent Application No. PCT/JP2019/023421, mailed on Aug. 27, 2019; with English translation.

Decision of Refusal dated Mar. 28, 2023 issued in the corresponding Japanese Patent Application No. 2021-181860, with English machine translation.

Notice of Reasons for Refusal dated Oct. 4, 2022 issued in the corresponding Japanese Patent Application No. 2021-181860, with English translation.

First Office Action issued in corresponding Chinese Patent Application No. 201980048563.9, dated Nov. 18, 2021; with English translation.

European Office Action issued in the corresponding European Patent Application No. 19848618.5, dated Feb. 16, 2022.

Summons to Attend Oral Proceedings Pursuant to Rule 115(1) EPC dated Nov. 2, 2022 issued in the corresponding European Patent Application No. 19848618.5.

Notice of Reasons for Refusal issued in Japanese Patent Application No. 2020-536354, dated Sep. 14, 2021; with English translation.

Extended European Search Report issued in European Patent Application No. 19848618.5, dated Jul. 29, 2021.

Communication pursuant to Article 94(3) EPC issued in corresponding EP Application No. 19848618.5, dated Aug. 31, 2023.

* cited by examiner

| | | ID INFORMATION | | | | | |
|---|---|---|---|---|---|---|---|
| | PRODUCT CODE | PHARMACEUTICAL NAME | MANUFACTURER CODE | RECEPTION DATE | EXPIRATION DATE | LOT NUMBER | IMAGE DATA |
| PHARMACEUTICAL STORAGE BOX A | AAA-BBB | ABC | XX-1 | 2018.7.1 | 2018.9.20 | AB111 | 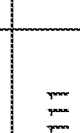 |
| | AAA-CCC | BCD | YY-2 | 2018.7.10 | 2018.9.10 | AC111 |  |
| | BBB-CCC | CDE | XX-1 | 2018.7.5 | 2018.10.5 | BC211 |  |
| PHARMACEUTICAL STORAGE BOX B | BBB-DDD | DEF | ZZ-1 | 2018.7.20 | 2018.10.15 | BD211 |  |
| | CCC-DDD | EFG | ZZ-2 | 2018.7.20 | 2018.9.30 | CD211 |  |
| ..... | ..... | ..... | ..... | ..... | ..... | ..... | ..... |
FIG. 8

| | TEMPERATURE INFORMATION |
|---|---|
| PHARMACEUTICAL STORAGE BOX A | ○○°C |
| PHARMACEUTICAL STORAGE BOX B | △△°C |
| ⋮ | ⋮ |

FIG. 9

| | PRODUCT CODE | PUT-IN CHECK TIME | TAKE-OUT CHECK TIME | ANTENNA CODE | RECEPTION SIGNAL STRENGTH |
|---|---|---|---|---|---|
| PHARMACEUTICAL STORAGE BOX A | AAA-BBB | 2018.7.1 09:23:47 | 2018.8.10 11:53:50 | A-1 (220) A-2 (230) | ○○dBm △△dBm |
| | AAA-CCC | 2018.7.10 10:11:13 | — | A-1 (220) A-2 (230) | ○○dBm △△dBm |
| PHARMACEUTICAL STORAGE BOX B | BBB-CCC | 2018.7.5 14:23:53 | 2018.8.8 13:20:25 | B-1 (220) B-2 (230) | ○○dBm △△dBm |
| | BBB-DDD | 2018.7.20 13:17:49 | — | B-1 (220) B-2 (230) | △△dBm |
| | CCC-DDD | 2018.7.20 13:21:30 | — | B-1 (220) B-2 (230) | □dBm |
| ...... | ...... | ...... | ...... | ...... | ...... |

PRODUCT CODE AAA-BBB

PHARMACEUTICAL INFORMATION

| PHARMACEUTICAL NAME | ABC |
| --- | --- |
| MANUFACTURER CODE | XX-1 |
| RECEPTION DATE | 2018.7.1 |
| EXPIRATION DATE | 2018.9.20 |
| LOT NUMBER | AB111 |

PRODUCT CODE AAA-BBB

PUT-IN HISTORY

| PUT-IN CHECK TIME | 2018.7.1 09:23:47 |
| --- | --- |
| ANTENNA CODE | A-1(220) A-2(230) |
| RECEPTION SIGNAL STRENGTH | ○○dBm |
| TEMPERATURE | ○○°C |

PUT-IN LIST

| PRODUCT CODE | PHARMACEUTICAL NAME | EXPIRATION DATE | TEMPERATURE |
| --- | --- | --- | --- |
| AAA-BBB | ABC | 2018.9.20 | ○○°C |
| AAA-CCC | BCD | 2018.9.10 | ○○°C |
| BBB-CCC | CDE | 2018.10.5 | △△°C |
| BBB-DDD | DEF | 2018.10.15 | △△°C |
| CCC-DDD | EFG | 2018.9.30 | △△°C |
| ..... | ..... | ..... | ..... |

PUT-IN OPERATION

PLEASE PUT PHARMACEUTICAL INTO REFRIGERATOR, CLOSE DOOR, AND PRESS PUT-IN CONFIRMATION BUTTON.

| PHARMACEUTICAL NAME | MANUFACTURING NUMBER | DURATION OF USE | EPC CODE |
|---|---|---|---|
| | | | |
| | | | |

CANCEL

PUT-IN CONFIRMATION

FIG. 18B

PUT-IN OPERATION

PLEASE PUT PHARMACEUTICAL INTO REFRIGERATOR, CLOSE DOOR, AND PRESS PUT-IN CONFIRMATION BUTTON.
PUT-IN OF FOLLOWING PHARMACEUTICALS INTO REFRIGERATOR HAS BEEN DETECTED.

| PHARMACEUTICAL NAME | MANUFACTURING NUMBER | DURATION OF USE | EPC CODE |
|---|---|---|---|
| PHARMACEUTICAL AAA | BBBBB | YYYY/MM/DD | AAAA BBBB CCCC |
| PHARMACEUTICAL AAA | BBBBB | YYYY/MM/DD | AAAA BBBB CCCC |
| | | | |

CANCEL

PUT-IN CONFIRMATION

TAKE-OUT OPERATION

PLEASE TAKE PHARMACEUTICAL OUT OF REFRIGERATOR, CLOSE DOOR, AND PRESS TAKE-OUT CONFIRMATION BUTTON.

| PHARMACEUTICAL NAME | MANUFACTURING NUMBER | DURATION OF USE | EPC CODE |
|---|---|---|---|
|  |  |  |  |
|  |  |  |  |

CANCEL

TAKE-OUT CONFIRMATION

TAKE-OUT OPERATION

PLEASE TAKE PHARMACEUTICAL OUT OF REFRIGERATOR, CLOSE DOOR, AND PRESS TAKE-OUT CONFIRMATION BUTTON.
TAKE-OUT OF FOLLOWING PHARMACEUTICALS FROM REFRIGERATOR HAS BEEN DETECTED.

| PHARMACEUTICAL NAME | MANUFACTURING NUMBER | DURATION OF USE | EPC CODE |
|---|---|---|---|
| PHARMACEUTICAL AAA | BBBBB | YYYY/MM/DD | AAAA BBBB CCCC |
| PHARMACEUTICAL AAA | BBBBB | YYYY/MM/DD | AAAA BBBB CCCC |
|  |  |  |  |

CANCEL

TAKE-OUT CONFIRMATION

FIG. 19C

TAKE-OUT-FOR-RETURN OPERATION

PLEASE TAKE PHARMACEUTICAL OUT OF REFRIGERATOR, CLOSE DOOR, AND PRESS TAKE-OUT-FOR-RETURN CONFIRMATION BUTTON.

| PHARMACEUTICAL NAME | MANUFACTURING NUMBER | DURATION OF USE | EPC CODE |
|---|---|---|---|
|  |  |  |  |
|  |  |  |  |

CANCEL

TAKE-OUT-FOR-RETURN CONFIRMATION

FIG. 20B

TAKE-OUT-FOR-RETURN OPERATION

PLEASE TAKE PHARMACEUTICAL OUT OF REFRIGERATOR, CLOSE DOOR, AND PRESS TAKE-OUT-FOR-RETURN CONFIRMATION BUTTON.
TAKE-OUT OF FOLLOWING PHARMACEUTICALS FROM REFRIGERATOR HAS BEEN DETECTED.

| PHARMACEUTICAL NAME | MANUFACTURING NUMBER | DURATION OF USE | EPC CODE |
|---|---|---|---|
| PHARMACEUTICAL AAA | BBBBB | YYYY/MM/DD | AAAA BBBB CCCC |
| PHARMACEUTICAL AAA | BBBBB | YYYY/MM/DD | AAAA BBBB CCCC |
| | | | |

[CANCEL]  [TAKE-OUT-FOR-RETURN CONFIRMATION]

FIG. 20C

PHARMACEUTICAL MANAGEMENT SYSTEM

CROSS-REFERENCE TO RELATED APPLICATIONS

This is a continuation application of International Patent Application No. PCT/JP2019/023421 filed Jun. 13, 2019, which claims the benefit of priority to Japanese Patent Application No. 2018-151306 filed Aug. 10, 2018, the entire contents of each of which the entire contents of each of which are incorporated herein by reference.

BACKGROUND

Technical Field

The present disclosure relates to a pharmaceutical management system.

Description of the Related Art

For example, pharmaceutical refrigerators to store pharmaceuticals in an environment at a predetermined refrigeration temperature is known (for example, see Japanese Patent Application Publication No. 2000-105149).

In a medical institution, a pharmaceutical of a pharmaceutical manufacturer delivered from a pharmaceutical wholesaler is stored in a pharmaceutical refrigerator and kept in an environment at a predetermined refrigeration temperature optimal for the pharmaceutical. However, in actual, the pharmaceutical manufacturer and the pharmaceutical wholesaler cannot sufficiently grasp information on the medical institution side such as how the pharmaceutical is managed in terms of temperature and when the pharmaceutical is consumed by being prescribed. Thus, there is a possibility that the pharmaceutical cannot be smoothly distributed among the medical institution, the pharmaceutical wholesaler, and the pharmaceutical manufacturer.

Accordingly, the present disclosure is directed to provision of a pharmaceutical management system capable of smoothly distributing a pharmaceutical among a medical institution, a pharmaceutical wholesaler, and a pharmaceutical manufacturer.

SUMMARY

A primary aspect of the present disclosure is a pharmaceutical management system comprising: an IC tag attached to a pharmaceutical; a pharmaceutical storage box to store the pharmaceutical and read information of the IC tag; a controller to acquire the information of the IC tag from the pharmaceutical storage box and manage the pharmaceutical; and a pharmaceutical refrigerator to store the pharmaceutical storage box to refrigerate the pharmaceutical.

Other features of the present disclosure will become apparent from the following description and the drawings.

According to the present disclosure, it is possible to smoothly distribute a pharmaceutical among a medical institution, a pharmaceutical wholesaler, and a pharmaceutical manufacturer.

BRIEF DESCRIPTION OF THE DRAWINGS

FIG. 8 is a view illustrating an example of a table stored in a storage device to be used in a pharmaceutical management system according to an embodiment of the present disclosure.

FIG. 9 is a view illustrating another example of a table stored in a storage device to be used in a pharmaceutical management system according to an embodiment of the present disclosure.

FIG. 10 is a view illustrating another example of a table stored in a storage device to be used in a pharmaceutical management system according to an embodiment of the present disclosure.

FIG. 17 is a view illustrating an example of a management status of pharmaceuticals that is displayed on a display unit in a pharmaceutical management system according to an embodiment of the present disclosure.

FIG. 18B is a view illustrating an example of a screen displayed on a display unit as a procedure for confirming putting-in of pharmaceuticals in one process in a pharmaceutical management system according to an embodiment of the present disclosure.

FIG. 18C is a view illustrating an example of a screen displayed on a display unit as a procedure for confirming putting-in of pharmaceuticals in one process in a pharmaceutical management system according to an embodiment of the present disclosure.

FIG. 19B is a view illustrating an example of a screen displayed on a display unit as a procedure for confirming taking-out of pharmaceuticals in one process in a pharmaceutical management system according to an embodiment of the present disclosure.

FIG. 19C is a view illustrating an example of a screen displayed on a display unit as a procedure for confirming taking-out of pharmaceuticals in one process in a pharmaceutical management system according to an embodiment of the present disclosure.

FIG. 20B is a view illustrating an example of a screen displayed on a display unit as a procedure for confirming taking-out for return of pharmaceuticals in one process in a pharmaceutical management system according to an embodiment of the present disclosure.

FIG. 20C is a view illustrating an example of a screen displayed on a display unit as a procedure for confirming taking-out for return of pharmaceuticals in one process in a pharmaceutical management system according to an embodiment of the present disclosure.

DETAILED DESCRIPTION

At least the following matters will be apparent from illustration in the description and the attached drawings.
===Pharmaceutical Management System===

A medical institution sometimes handles a pharmaceutical that is high cost and needs strict distribution management (for example, an antineoplastic agent, a therapeutic agent for hemophilia, a plasma preparation, an albumin preparation, a therapeutic agent for autoimmune, a vaccine, a therapeutic agent for a rare disease, or the like. Hereinafter, also referred to as "specialty pharmaceutical" for convenience of explanation) as a pharmaceutical of a pharmaceutical manufacturer delivered from a pharmaceutical wholesaler. In this case, the medical institution needs to strictly manage temperature such that the specialty pharmaceutical stored in a pharmaceutical refrigerator is kept at a temperature optimal for the specialty pharmaceutical. However, in actual, the pharmaceutical manufacturer and the pharmaceutical wholesaler cannot sufficiently grasp information on the medical institution side, such as how the specialty pharmaceutical is managed in terms of temperature. Accordingly, the medical institution cannot return the specialty pharmaceutical to the pharmaceutical manufacturer or the pharmaceutical wholesaler, which may hinder the distribution of all pharmaceuticals including the specialty pharmaceutical among the medical institution, the pharmaceutical wholesaler, and the pharmaceutical manufacturer. Thus, a pharmaceutical management system according to an embodiment of the present disclosure is proposed so that pharmaceuticals are smoothly distributed among the medical institution, the pharmaceutical wholesaler, and the pharmaceutical manufacturer.

Figure 1:
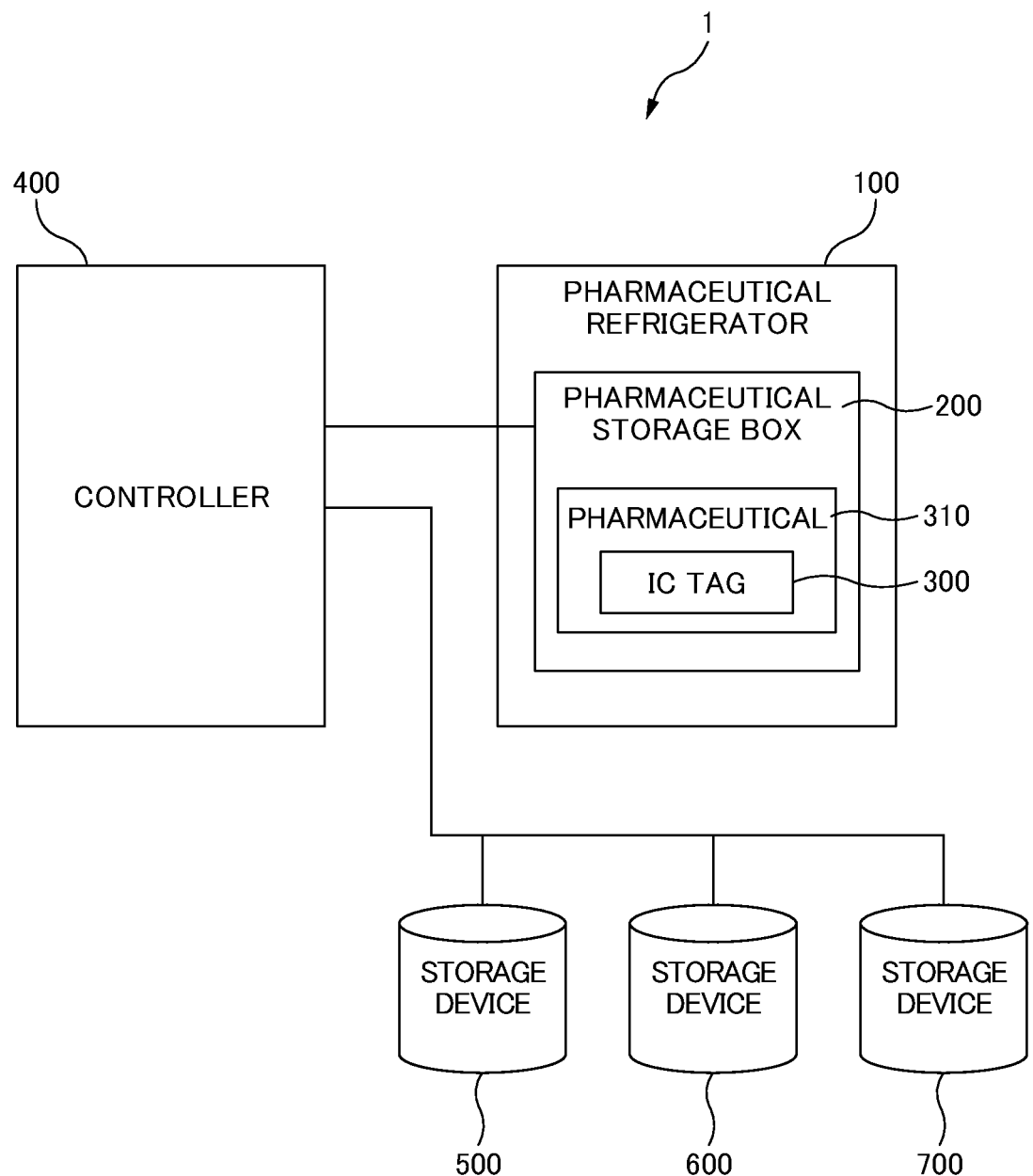
FIG. 1 is a block diagram illustrating an example of a pharmaceutical management system according to an embodiment of the present disclosure.

FIG. 1 is a block diagram illustrating an example of the pharmaceutical management system according to an embodiment of the present disclosure.

The pharmaceutical management system 1 includes a pharmaceutical refrigerator 100, a pharmaceutical storage box 200, an IC tag 300, a controller 400, and storage devices 500, 600, 700.

The pharmaceutical refrigerator 100 is an apparatus that keeps a pharmaceutical 310 in an environment at an optimal refrigeration temperature. The pharmaceutical storage box 200 is a device to store the pharmaceutical 310 with the IC tag 300 attached thereto, the pharmaceutical storage box 200 having a function of receiving ID information indicating the pharmaceutical 310 stored in the IC tag 300. The pharmaceutical storage box 200 is to be stored in the pharmaceutical refrigerator 100. The controller 400 is a device to acquire the ID information stored in the IC tag 300 from the pharmaceutical storage box 200 and manage the ID information in association with, for example, information on refrigeration temperature and putting-in and taking-out of the pharmaceutical 310. The storage devices 500, 600, 700 are devices that are accessibly coupled to the controller 400 and into and from which the controller 400 appropriately stores and reads information needed for management of the pharmaceutical 310. The storage devices 500, 600, 700 may be configured with hard disks included in a personal computers or configured with data servers to be accessed via a network. The pharmaceutical refrigerator 100, the pharmaceutical storage box 200, the IC tag 300, the controller 400, and the storage devices 500, 600, 700 will be described later in detail.

<<Pharmaceutical Refrigerator>>

Figure 2:
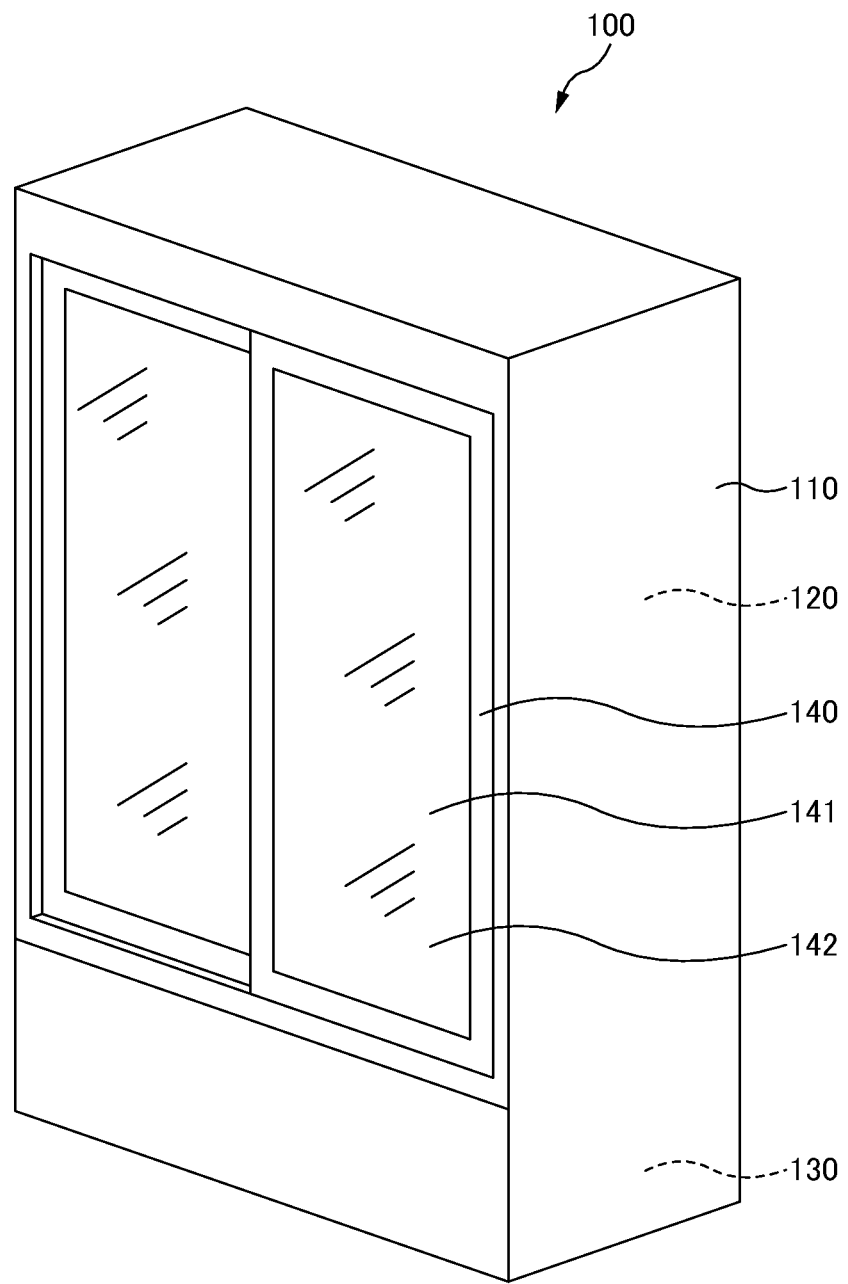
FIG. 2 is a perspective view illustrating an example of a pharmaceutical refrigerator to be used in a pharmaceutical management system according to an embodiment of the present disclosure.
Figure 3:
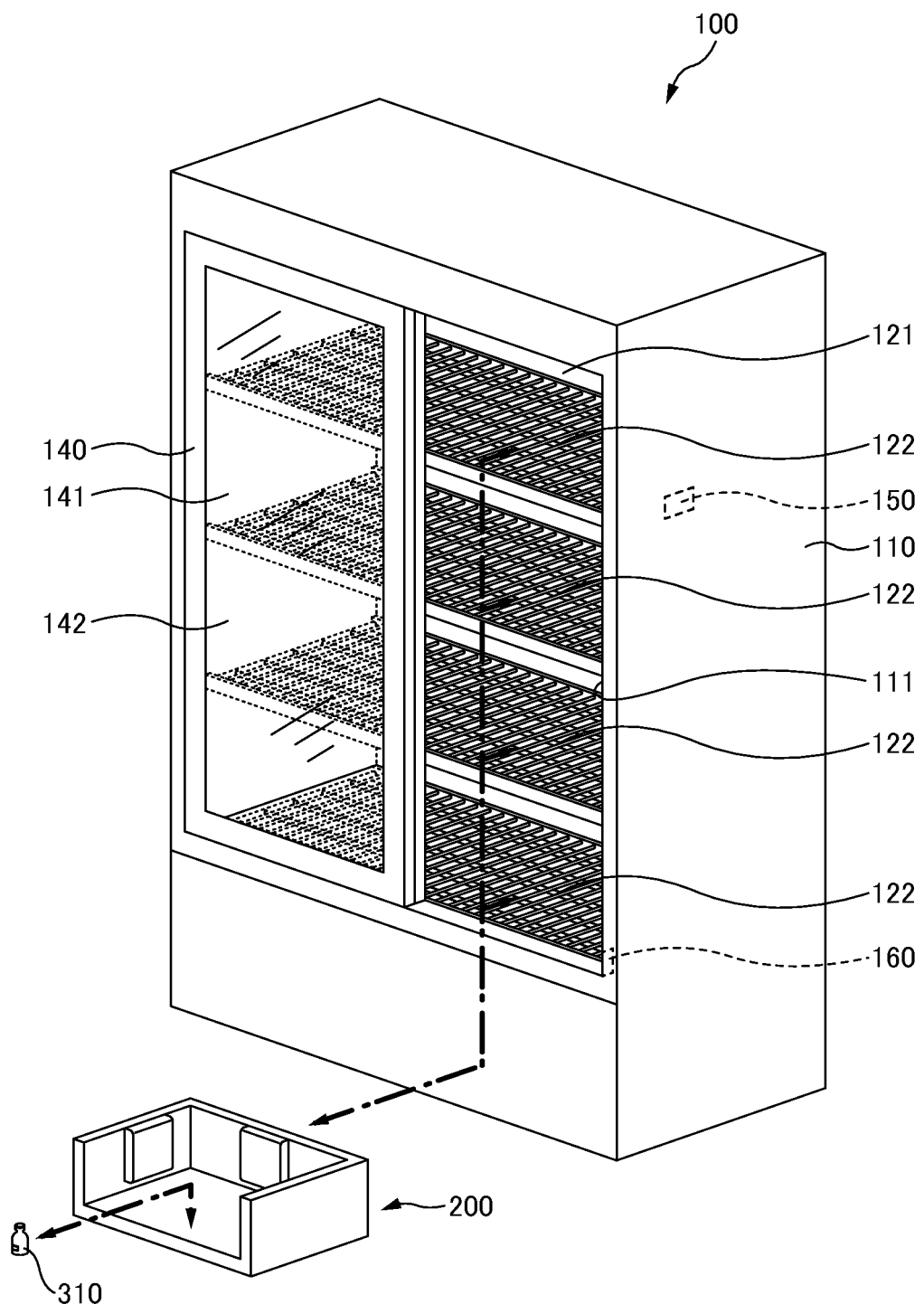
FIG. 3 is a perspective view illustrating how a pharmaceutical storage box is taken in and out of a pharmaceutical refrigerator of FIG. 2.

FIG. 2 is a perspective view illustrating an example of the pharmaceutical refrigerator to be used for the pharmaceutical management system according to an embodiment of the present disclosure is to be stored. FIG. 3 is a perspective view illustrating how the pharmaceutical storage box is taken in and out of the pharmaceutical refrigerator of FIG. 2.

The pharmaceutical refrigerator 100 is an apparatus that is installed, for example, in a medical institution, and that stores pharmaceuticals (pharmaceutical products) of a pharmaceutical manufacturer delivered via a pharmaceutical wholesaler, and refrigerates them at an optimal temperature.

The pharmaceutical refrigerator 100 includes an outer case 110, an inner case 120, a machine room 130, a door 140, a temperature sensor 150, and a door sensor 160.

The outer case 110 has a rectangular cuboid shape and has an opening 111 on a front surface thereof for loading and unloading pharmaceuticals. The inner case 120 has a rectangular cuboid shape, has an opening 121 on a front surface thereof to communicate with the opening 111, and is provided in the outer case 110 with a heat insulating material provided between the inner case 120 and the outer case 110. Multiple shelves 122 are provided in the inner case 120 to store the pharmaceuticals. The shelves 122 have, for example, a mesh shape to allow air to pass therethrough. The machine room 130 is formed below the inner case 120 in the outer case 110 and a cooling device (not illustrated) that refrigerates the inside of the inner case 120 is provided. The cooling device circulates coolant by using, for example, a compressor, a condenser, an evaporator, and the like, and is coupled to the inner case 120 such that air at a predetermined refrigeration temperature circulates in the inner case 120. The door 140 has a glass window 141 (front glass) for checking the inside of the inner case 120, and is slidably attached to the opening 111 of the outer case 110. Closing the door 140 causes the inside of the inner case 120 to be a closed space and enables refrigeration of the pharmaceuticals.

In an embodiment of the present disclosure, it is assumed that the pharmaceutical storage box 200 for storing the pharmaceutical 310 to be managed is placed on one of the shelves 122 in the inner case 120 of the pharmaceutical refrigerator 100 so as to be insertably removable from the pharmaceutical refrigerator through the openings 111, 121.

The temperature sensor 150 is a sensor with a glycol bottle that can detect the temperature of the pharmaceutical in the inner box 120 without being affected by a temperature change caused by opening and closing of the door 140 of the pharmaceutical refrigerator 100 and circulation of air in the pharmaceutical refrigerator 100, for example, and is attached to a predetermined position (for example, an inner surface) in the inner box 120 to enable accurate detection of the temperature of the pharmaceutical 310 in the pharmaceutical storage box 200 placed on one of the shelves 122. Note that, when multiple pharmaceutical storage boxes 200 are to be stored in the pharmaceutical refrigerator 100, multiple temperature sensors 150 may be attached to predetermined positions corresponding to the multiple pharmaceutical storage boxes 200 (for example, positions on surfaces of the shelves 122 where the pharmaceutical storage boxes 200 are to be placed) in the inner box 120 to enable respective accurate detections of the temperatures of the pharmaceuticals 310 in the multiple pharmaceutical storage boxes 200.

The door sensor 160 is a sensor to detect opening and closing of the door 140 and is attached to an inner surface of the opening 111. The door sensor 160 is configured using, for example, a microswitch.

<<Pharmaceutical Storage Box>>

A pharmaceutical storage box 200A (first example) and a pharmaceutical storage box 200B (second example) will be described below as the pharmaceutical storage box 200. Note that one or both of the pharmaceutical storage boxes 200A, 200B may be selectively stored in the pharmaceutical refrigerator 100.

First Example

Figure 4:
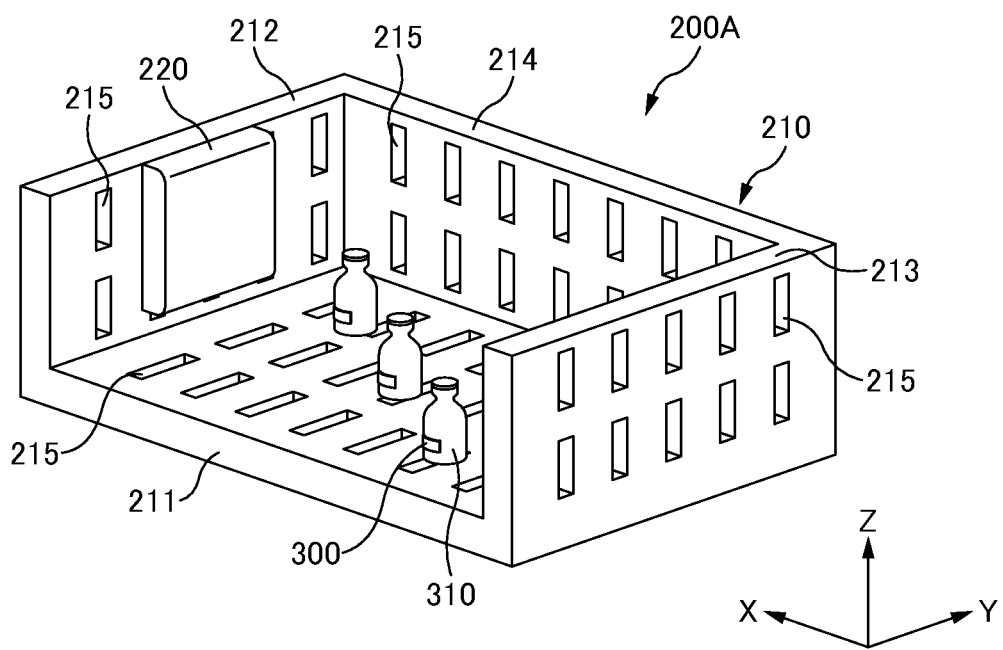
FIG. 4 is a perspective view illustrating an example of a pharmaceutical storage box to be used in a pharmaceutical management system according to an embodiment of the present disclosure.

FIG. 4 is a perspective view illustrating an example of the pharmaceutical storage box to be used for the pharmaceutical management system according to an embodiment of the present disclosure. In FIG. 3, an X-axis is an axis extending in a width direction of the pharmaceutical storage box, a Y-axis is an axis extending in a front-back direction of the pharmaceutical storage box, and a Z-axis is an axis extending in a height direction of the pharmaceutical storage box.

The pharmaceutical storage box 200A is a box for storing pharmaceuticals 310 to be managed.

The pharmaceutical storage box 200A includes a storage portion 210 and an antenna 220.

The storage portion 210 is defined by a total of four flat plates of a bottom plate 211, side plates 212, 213, and a back plate 214. The storage portion 210 may be formed, for example, such that the bottom plate 211, the side plates 212, 213, and the back plate 214 are integrally formed by die molding using a resin material. Alternatively, the storage portion 210 may be formed, for example, such that the bottom plate 211, the side plates 212, 213, and the back plate 214 are separately formed by die molding using a resin material, and then the bottom plate 211, the side plates 212, 213, and the back plate 214 are bonded to one another with adhesive and/or the like. The storage portion 210 has multiple air passage holes 215 in each of the bottom plate 211, the side plates 212, 213, and the back plate 214 such that the pharmaceuticals 310 stored in the storage portion 210 are effectively refrigerated by the air circulating in the inner case 120.

The IC tag 300 for identifying the pharmaceutical 310 is attached to each pharmaceutical 310. In an embodiment of the present disclosure, it is assumed that the IC tag 300 is a passive RFID tag including a loop coil and an IC chip, for example. The ID information indicating the pharmaceutical 310 is stored in the IC chip in advance. The IC chip stores in advance the ID information, such as a "product code" assigned to the pharmaceutical 310 itself, a "pharmaceutical name", a "manufacturer code" indicating the pharmaceutical manufacturer, a "reception date" of the pharmaceutical 310, an "expiration date" of the pharmaceutical 310, a "lot number" of the pharmaceutical 310, "image data" of the pharmaceutical 310, and the like.

The antenna 220 is a device configured to transmit a radio wave in the storage portion 210 to activate the IC chip in the IC tag 300 attached to each pharmaceutical 310, and receive the ID information indicating the pharmaceutical 310. The ID information received by the antenna 220 is stored, by a controller described later, in the storage device 500 as information for managing the pharmaceutical 310. The antenna 220 has a flat plate shape and is attached to, for example, a surface of the side plate 212 facing the side plate 213.

Storing the pharmaceuticals 310 in the pharmaceutical storage box 200A and storing the pharmaceutical storage box 200A in the pharmaceutical refrigerator 100 enables management of the pharmaceuticals 310 and the pharmaceutical storage box 200A storing the pharmaceuticals 310. In addition, the pharmaceutical storage box 200A is associated with the antenna 220, which enables identification of the pharmaceutical storage box 200A. Thus, it is also possible to manage the pharmaceuticals 310 and the pharmaceutical storage boxes 200A storing the pharmaceuticals 310 such that the pharmaceuticals 310 are sorted according to their types, pharmaceutical wholesalers, pharmaceutical manufacturers, and/or the like, and separately stored in multiple pharmaceutical storage boxes 200A, and then the multiple pharmaceutical storage boxes 200A are stored in the pharmaceutical refrigerator 100. In addition, a pharmaceutical refrigerator 100 already installed in a medical institution or the like can also be used to store the pharmaceutical storage boxes 200A.

Second Example

Figure 5:
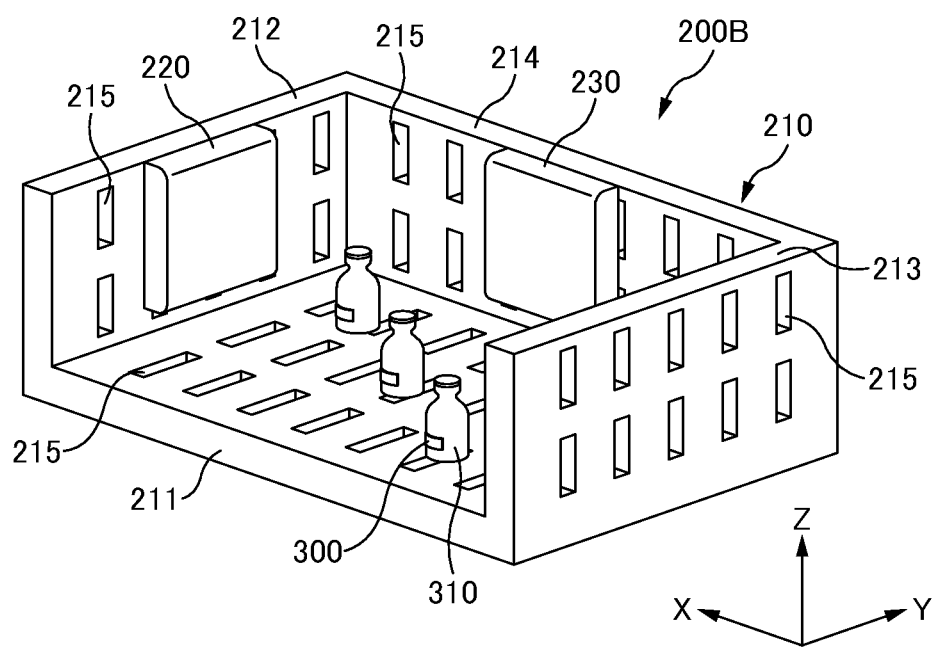
FIG. 5 is a perspective view illustrating another example of a pharmaceutical storage box to be used in a pharmaceutical management system according to an embodiment of the present disclosure.
Figure 6:
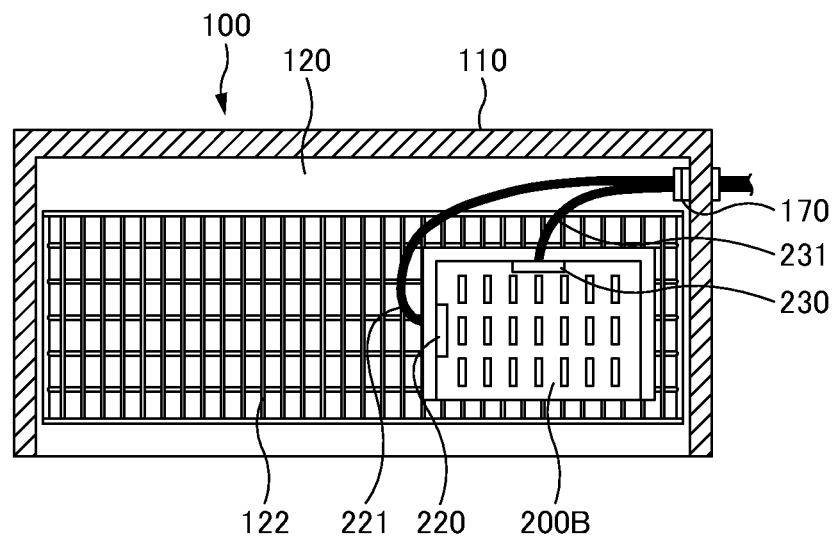
FIG. 6 is a plan view illustrating an example of a coupling device for leading out a coupling line of an antenna to the outside in a pharmaceutical storage box of FIG. 5

FIG. 5 is a perspective view illustrating another example of the pharmaceutical storage box to be used for the pharmaceutical management system according to an embodiment of the present disclosure. In FIG. 5, an X-axis is an axis extending in a width direction of the pharmaceutical storage box, a Y-axis is an axis extending in a front-back direction of the pharmaceutical storage box, and a Z-axis is an axis extending in a height direction of the pharmaceutical storage box. FIG. 6 is a plan view illustrating an example of a coupling portion for leading out a coupling line of an antenna in the pharmaceutical storage box of FIG. 5. Note that, in the second example, the same components as those in the first example are denoted by the same reference numerals and description thereof is omitted.

A pharmaceutical storage box 200B is a box for storing the pharmaceuticals 310 to be managed.

The pharmaceutical storage box 200B includes the storage portion 210 and antennas 220, 230.

The antennas 220, 230 are devices configured to transmit radio waves in the storage portion 210 to activate the IC chip in the IC tag 300 attached to each pharmaceutical 310, and receive the ID information indicating the pharmaceutical 310. The ID information received by the antennas 220, 230 is stored, by the controller described later, in the storage device 500 as the information for managing the pharmaceutical 310.

In the first example, when the pharmaceutical 310 is stored in the pharmaceutical storage box 200B such that the surface of the IC tag 300 is positioned perpendicular to the surface of the antenna 220 facing the side plate 213, the radio wave transmitted from the antenna 220 and the loop coil in the IC tag 300 may not be interlinked, and thus the antenna 220 may not correctly receive the ID information indicating the pharmaceutical 310 from the IC chip in the IC tag 300 thereof. Specifically, when the pharmaceutical 310 is stored in the pharmaceutical storage box 200 such that the surface of the IC tag 300 is along a plane formed by the X-axis and the Z-axis, the surface (surface extending along the plane formed by the X-axis and the Z-axis) of the IC tag 300 is positioned perpendicular to the surface (surface extending along a plane formed by the Y-axis and the Z-axis) of the antenna 220 facing the side surface 213, and thus the antenna 220 may not correctly receive the ID information indicating the pharmaceutical 310 from the IC chip in the IC tag 300 thereof. For example, when the pharmaceutical 310 is enclosed in a vial and the IC tag 300 is attached to a side surface of the vial, the aforementioned issue may arise.

Thus, the antenna 230 having a flat plate shape is attached to a surface of the back plate 214 between the side plates 212 and 213. This establishes a positional relationship that the surface (surface extending along the plane formed by the Y-axis and the Z-axis) of the antenna 220 is perpendicular to the surface (surface extending along the plane formed by the X-axis and the Z-axis) of the antenna 230. Accordingly, the antennas 220, 230 can correctly receive the ID information indicating each pharmaceutical 310 from the IC chip in the IC tag 300 thereof, regardless of the direction in which the pharmaceutical 310 is stored about the Z-axis.

A coupling line (communication line) 221 of the antenna 220 and a coupling line (communication line) 231 of the antenna 230 are, for example, coupled to an external controller via a connector 170 provided at a corner on the rear side of the pharmaceutical refrigerator 100 so as not to hinder putting-in and taking-out of the pharmaceutical storage box 200B. The pharmaceutical storage box 200B can be easily taken in and out by plugging and unplugging the connector 170.

<<Controller>>

Figure 7:
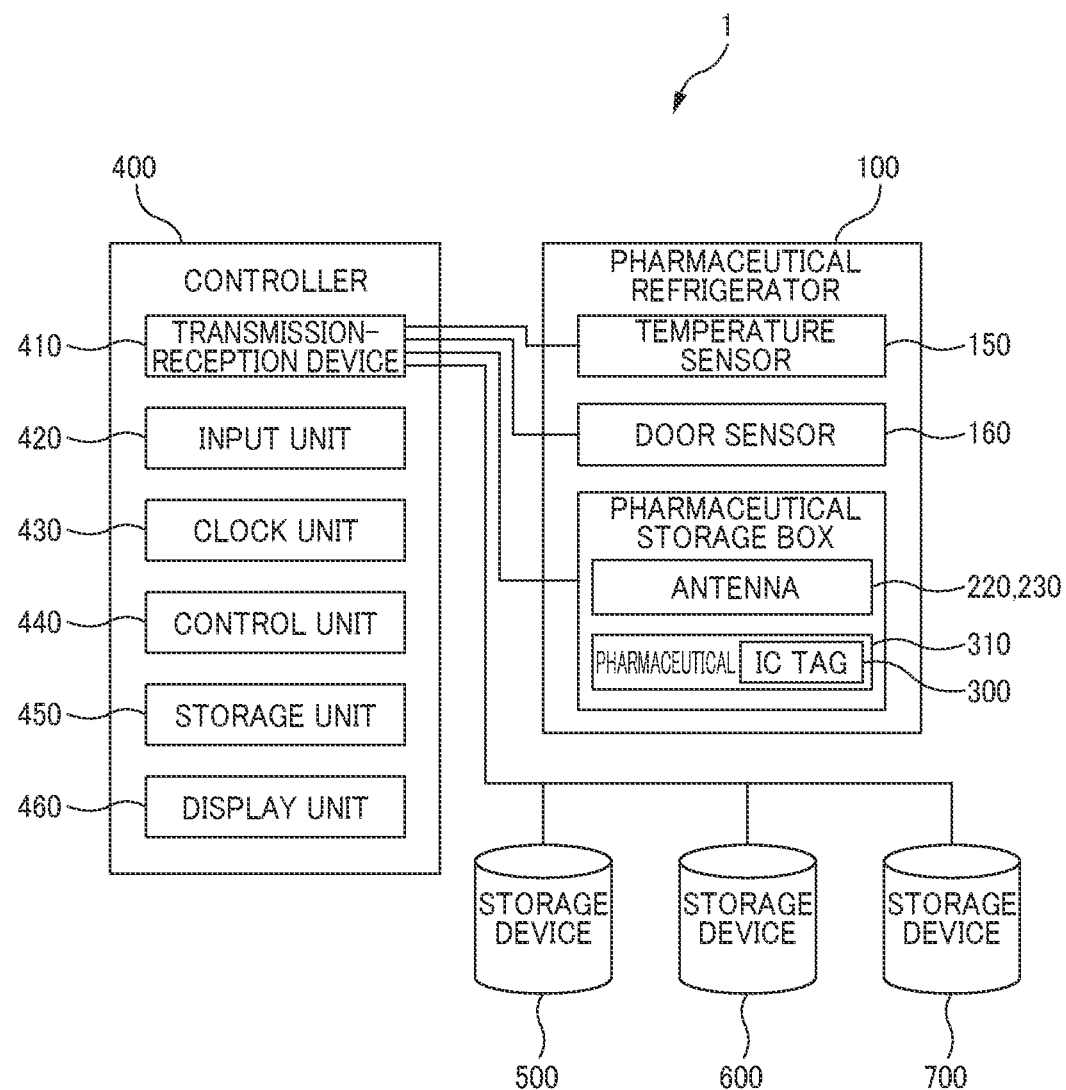
FIG. 7 is a block diagram specifically illustrating a pharmaceutical management system illustrated in FIG. 1.

FIG. 7 is a block diagram specifically illustrating the pharmaceutical management system illustrated in FIG. 1.

The controller 400 is a device to associate and manage the information on the refrigeration temperature and the putting-in and taking-out of the pharmaceutical 310 based on the ID information of the IC tag 300 that is received by the antenna 220 (230), temperature information of the pharmaceutical 310 in the pharmaceutical storage box 200 placed on the shelf 122 in the inner box 120 that is detected by the temperature sensor 150, and open-close information of the door 140 that is detected by the door sensor 160.

The controller 400 includes a transmission-reception device 410, an input unit 420, a clock unit 430, a control unit 440, a storage unit 450, and a display unit 460.

The transmission-reception device 410 is an interface for acquiring, at regular time intervals, the ID information of the IC tag 300 that is received by the antenna 220 (230), the temperature information of the pharmaceutical 310 in the pharmaceutical storage box 200 placed on the shelf 122 in the inner box 120 that is detected by the temperature sensor 150, and the open-close information of the door 140 that is detected by the door sensor 160. In addition, the transmission-reception device 410 is also an interface to be used to access the storage devices 500, 600, 700.

The input unit 420 receives various commands.

The clock unit 430 keeps track of the current time and measures a predetermined time period with respect to the current time as a reference.

The control unit 440 performs control for associating and managing the information on the refrigeration temperature and the putting-in and taking-out of the pharmaceutical 310. The control unit 440 is implemented by using, for example, a microcomputer.

The storage unit 450 stores in advance a program for associating and managing the information on the refrigeration temperature and the putting-in and taking-out of the pharmaceutical 310. The control unit 440 is operated by executing the program read from the storage unit 450.

The display unit 460 is a display that displays visual information where the information on the refrigeration temperature and the putting-in and taking-out of the pharmaceutical 310 are associated.

Although the input unit 420 and the display unit 460 are described as separate ones in this description, the input unit 420 and the display unit 460 may be an integral touch panel display.

<<Storage Device>>

FIG. 8 is a view illustrating an example of a table stored in the storage device to be used in the pharmaceutical management system according to an embodiment of the present disclosure.

The storage device 500 is a database for storing pieces of ID information (product codes, pharmaceutical names, manufacturer codes, reception dates, expiration dates, lot numbers, image data) indicating the pharmaceuticals 310 and are stored in advance in the IC tags 300, while regarding one pharmaceutical storage box 200 as a unit. For example, assume a case where two pharmaceutical storage boxes 200 are stored in the pharmaceutical refrigerator 100, two pharmaceuticals 310 are stored in one pharmaceutical storage box 200, and three pharmaceuticals 310 are stored in the other pharmaceutical storage box 200. In this case, the storage device 500 stores two pieces of ID information in a storage region allocated for the one pharmaceutical storage box 200 and stores three pieces of ID information in a storage region allocated for the other pharmaceutical storage box 200.

The controller 400 accesses the antennas 220 (230) in all the pharmaceutical storage boxes 200 stored in the pharmaceutical refrigerator 100 via the transmission-reception device 410 at regular time intervals, by causing the control unit 440 to operate according to the program read by the control unit 440 from the storage unit 450. When the pieces of ID information stored in the IC chips in the IC tags 300 are received by the antennas 220 (230), the pieces of ID information are stored as a table via the transmission-reception device 410 in storage regions for the respective pharmaceutical storage boxes 200 set in the storage device 500. Note that, with respect to ID information that is not stored in the storage regions, the storage device 500 newly stores it in the corresponding storage region(s), and with respect to ID information that is already stored in the storage region(s), the storage device 500 overwrites and stores it in the corresponding storage region(s).

FIG. 9 is a view illustrating another example of the table stored in the storage device to be used in the pharmaceutical management system according to an embodiment of the present disclosure.

The storage device 600 is a database for storing the temperature information detected by the temperature sensor 150 while regarding one pharmaceutical storage box 200 as a unit. For example, assume a case where two pharmaceutical storage boxes 200 are stored in the pharmaceutical refrigerator 100 and two temperature sensors 150 are attached corresponding to the two pharmaceutical storage boxes 200, respectively. In this case, the storage device 600 stores temperature information detected by one temperature sensor 150 attached corresponding to one pharmaceutical storage box 200 and temperature information detected by the other temperature sensor 150 attached corresponding to the other pharmaceutical storage box 200, in storage regions, respectively.

The controller 400 accesses the temperature sensors 150 via the transmission-reception device 410 at regular time intervals, by causing the control unit 440 to operate according to the program read by the control unit 440 from the storage unit 450. The pieces of temperature information acquired by the temperature sensors 150 are stored, via the transmission-reception device 410, as tables in the storage regions for the pharmaceutical storage boxes 200 set in the storage device 600, respectively. Note that the storage device 600 may overwrite and store the pieces of temperature information acquired by the temperature sensors 150, or may accumulate and store the pieces of temperature information acquired by the temperature sensors 150 such that changes in temperature inside the pharmaceutical storage boxes 200 over time are understandable.

FIG. 10 is a view illustrating another example of the table stored in the storage device to be used in the pharmaceutical management system according to an embodiment of the present disclosure.

The storage device 700 is a database in which, when the controller 400 determines that the pharmaceutical 310 has been put into or taken out of the pharmaceutical refrigerator 100, the product code of the pharmaceutical 310 is associated with information indicating put-in check time and take-out check time of the pharmaceutical 310, an antenna code assigned to the antenna 220 (230), and a reception signal strength of a signal received by the antenna 220 (230) from the IC tag 300 attached to the pharmaceutical 310 and storing these pieces of information while regarding one pharmaceutical storage box 200 as a unit. Note that, in an embodiment of the present disclosure, it is assumed that, when the controller 400 acquires the ID information from the antenna 220 (230) via the transmission-reception device 410, the information indicating the antenna code and the reception signal strength is attached to the ID information. For example, assume a case where two pharmaceutical storage boxes 200 are stored in the pharmaceutical refrigerator 100, two pharmaceuticals 310 are stored in one pharmaceutical storage box 200, and three pharmaceuticals 310 are stored in the other pharmaceutical storage box 200. In this case, the storage device 700 stores the information indicating the product codes, the put-in check times, the take-out check times, the antenna codes, and the reception signal strengths relating to the two pharmaceuticals 310 in a storage region allocated for the one pharmaceutical storage box 200, and stores the information indicating the product codes, the put-in check times, the take-out check times, the antenna codes, and the reception signal strengths relating to the three pharmaceuticals 310 in a storage region allocated for the other pharmaceutical storage box 200.

The controller 400 accesses the antennas 220 (230) in all the pharmaceutical storage boxes 200 stored in the pharmaceutical refrigerator 100 via the transmission-reception device 410 at regular time intervals, by causing the control unit 440 to operate according to the program read by the control unit 440 from the storage unit 450. When any of the pieces of ID information acquired from the antennas 220 (230) is ID information not stored in the storage device 500, the controller 400 determines that the pharmaceutical 310 has been put in. Then, the controller 400 associates the current time obtained by the clock unit 430 as the put-in check time with the antenna code and the reception signal strength, and stores the put-in check time in the storage region allocated for the pharmaceutical storage box 200 corresponding to the antenna code. In contrast, when the antenna 220 (230) no longer detects the piece of ID information of the pharmaceutical 310 that has been put-in, the controller 400 determines that the pharmaceutical 310 has been taken out. The controller 400 associates the current time obtained by the clock unit 430 as the take-out check time with the antenna code and the reception signal strength, and stores the take-out check time in the storage region allocated for the pharmaceutical storage box 200 corresponding to the antenna code.

<<Determination on Putting-in of Pharmaceutical>>

First Example

Figure 11:
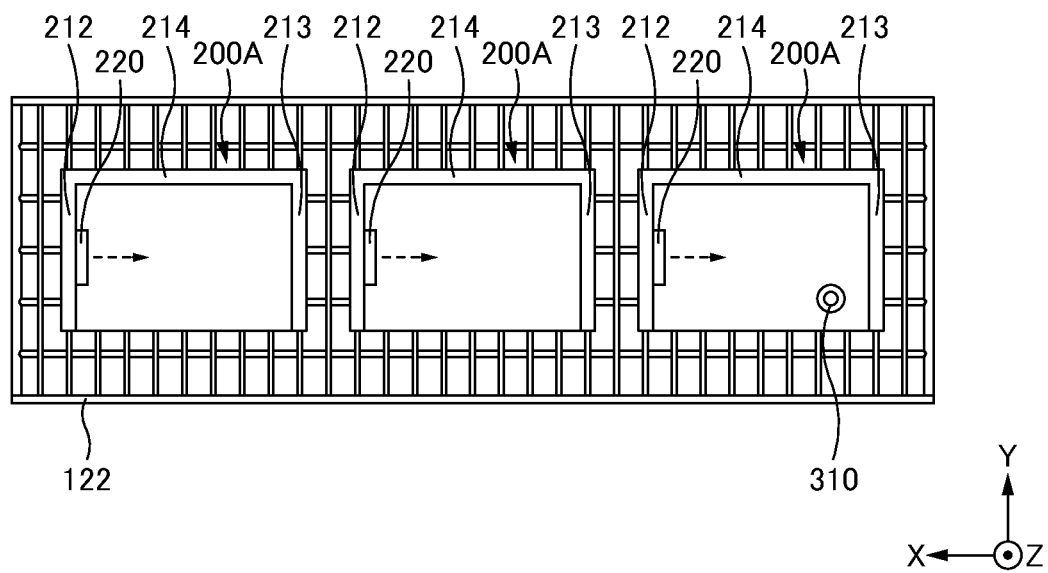
FIG. 11 is a plan view for explaining an example in which a pharmaceutical storage box actually storing a pharmaceutical is to be determined when the same ID information is acquired simultaneously from multiple pharmaceutical storage boxes in a pharmaceutical management system according to an embodiment of the present disclosure.

FIG. 11 is a plan view for explaining an example in which a pharmaceutical storage box actually storing a pharmaceutical is to be determined when the same ID information is acquired simultaneously from multiple pharmaceutical storage boxes in the pharmaceutical management system according to an embodiment of the present disclosure. For the convenience of explanation, it is assumed that, for example, three pharmaceutical storage boxes 200A are placed adjacent to one another in the width direction (direction extending along the X-axis) on one shelf 122. Specifically, in two pharmaceutical storage boxes 200A adjacent to each other, the side plate 212 of one pharmaceutical storage box 200A and the side plate 213 of the other pharmaceutical storage box 200A face each other. In addition, it is assumed that the pharmaceutical 310 is stored only in the pharmaceutical storage box 200A on the right side (−X side) of the drawing.

Figure 12:
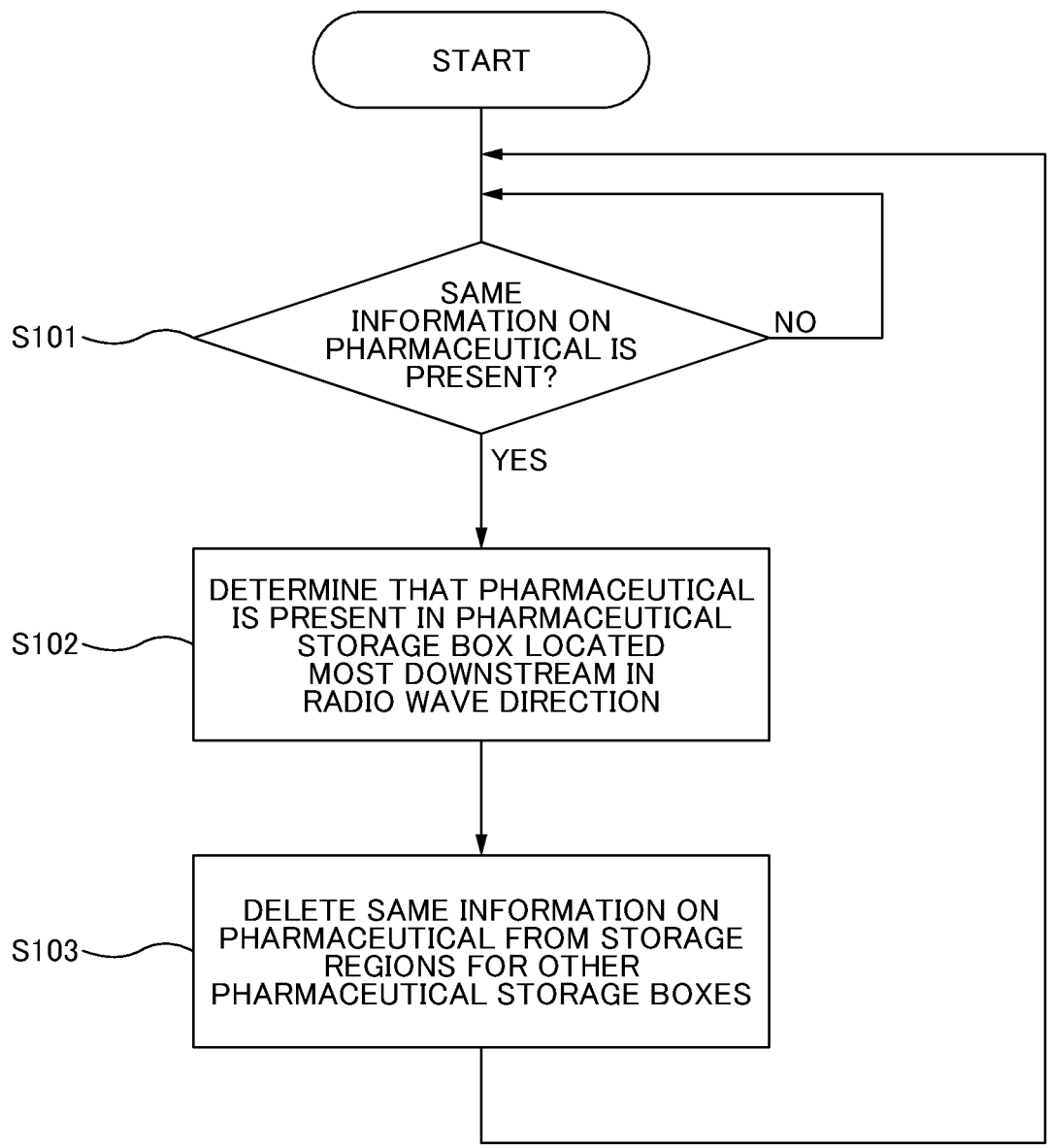
FIG. 12 is a flowchart for explaining an example of a determination operation of a controller in FIG. 11.

FIG. 12 is a flowchart for explaining an example of a determination operation of the controller in FIG. 11. The determination operation of the controller is implemented by causing the control unit 440 to operate according to the program read from the storage unit 450.

A radio wave emitted from each antenna 220 has such a directivity that the radio wave mainly travels in a direction of a broken line arrow (−X direction) from the side plate 212 toward the side plate 213 in the pharmaceutical storage box 200A. Accordingly, at the same time when the antenna 220 of the pharmaceutical storage box 200A on the right side of the drawing receives the ID information from the IC tag 300 attached to the pharmaceutical 310, the antennas 220 of the pharmaceutical storage boxes 200A on the left side and at the center of the drawing may erroneously receive the ID information from the same IC tag 300 although no pharmaceuticals 310 are stored in the pharmaceutical storage boxes 200A on the left side and at the center of the drawing. In other words, the storage device 700 may erroneously store the same information as the information on the pharmaceutical 310 stored in the pharmaceutical storage box 200A on the right side of the drawing, into respective storage regions for the pharmaceutical storage boxes 200A on the left side and at the center of the drawing. Thus, when the storage device 700 erroneously stores the same information as the information on the pharmaceutical 310 stored in the pharmaceutical storage box 200A on the right side of the drawing into the respective storage regions for the pharmaceutical storage boxes 200A on the left side and at the center of the drawing, this information needs to be deleted.

First, the controller 400 accesses the storage device 700 to refer to the respective storage regions for the three pharmaceutical storage boxes 200A and determines whether the same information on the pharmaceutical 310 is stored or not, in other words, determines whether information of the same product code and the same put-in check time is stored or not (step S101).

For example, when information of the same product code and the same put-in check time is stored in the respective storage regions for the three pharmaceutical storage boxes 200A (step S101: YES), the controller 400 determines that the pharmaceutical 310 is stored in the pharmaceutical storage box 200A on the right side of the drawing that is located most downstream in the direction in which the radio waves are emitted from the antennas 220, based on the directivity of the radio waves emitted from the antennas 220 (step S102). Note that, when information of the same product code and the same put-in check time is not stored in the respective storage regions for the three pharmaceutical storage boxes 200A (step S101: NO), the controller 400 executes the determination operation of the step S101 again.

Next, the controller 400 deletes the information that is stored in the respective storage regions for the pharmaceutical storage boxes 200A on the left side and at the center of the drawing and that is the same as the information on the pharmaceutical 310 stored in the pharmaceutical storage box 200A on the right side of the drawing, according to the determination result of the step S102 (step S103).

This enables correct management of the put-in information of the pharmaceutical 310.

Second Example

Figure 13:
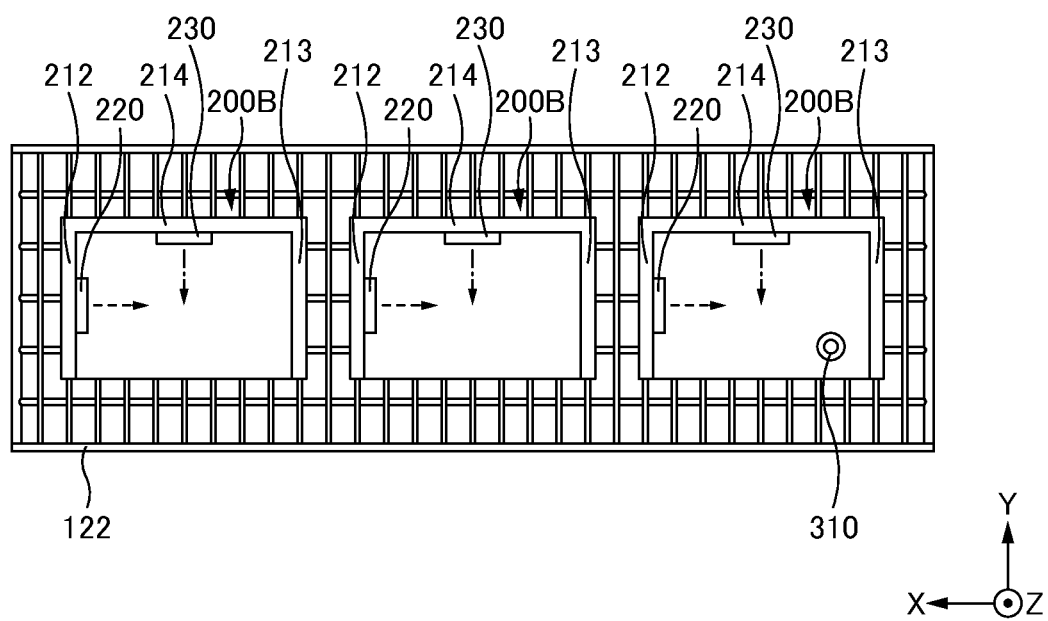
FIG. 13 is a plan view for explaining another example in which a pharmaceutical storage box actually storing a pharmaceutical is to be determined when the same ID information is acquired simultaneously from multiple pharmaceutical storage boxes in a pharmaceutical management system according to an embodiment of the present disclosure.

FIG. 13 is a plan view for explaining another example in which a pharmaceutical storage box actually storing a pharmaceutical is to be determined when the same ID information is acquired simultaneously from multiple pharmaceutical storage boxes in the pharmaceutical management system according to an embodiment of the present disclosure. For the convenience of explanation, it is assumed that, for example, three pharmaceutical storage boxes 200B are placed adjacent to one another in the width direction (direction extending along the X-axis) on one shelf 122. Specifically, in two pharmaceutical storage boxes 200B adjacent to each other, the side plate 212 of one pharmaceutical storage box 200B and the side plate 213 of the other pharmaceutical storage box 200B face each other. In addition, it is assumed that the pharmaceutical 310 is stored only in the pharmaceutical storage box 200B on the right side (−X side) of the drawing.

Figure 14:
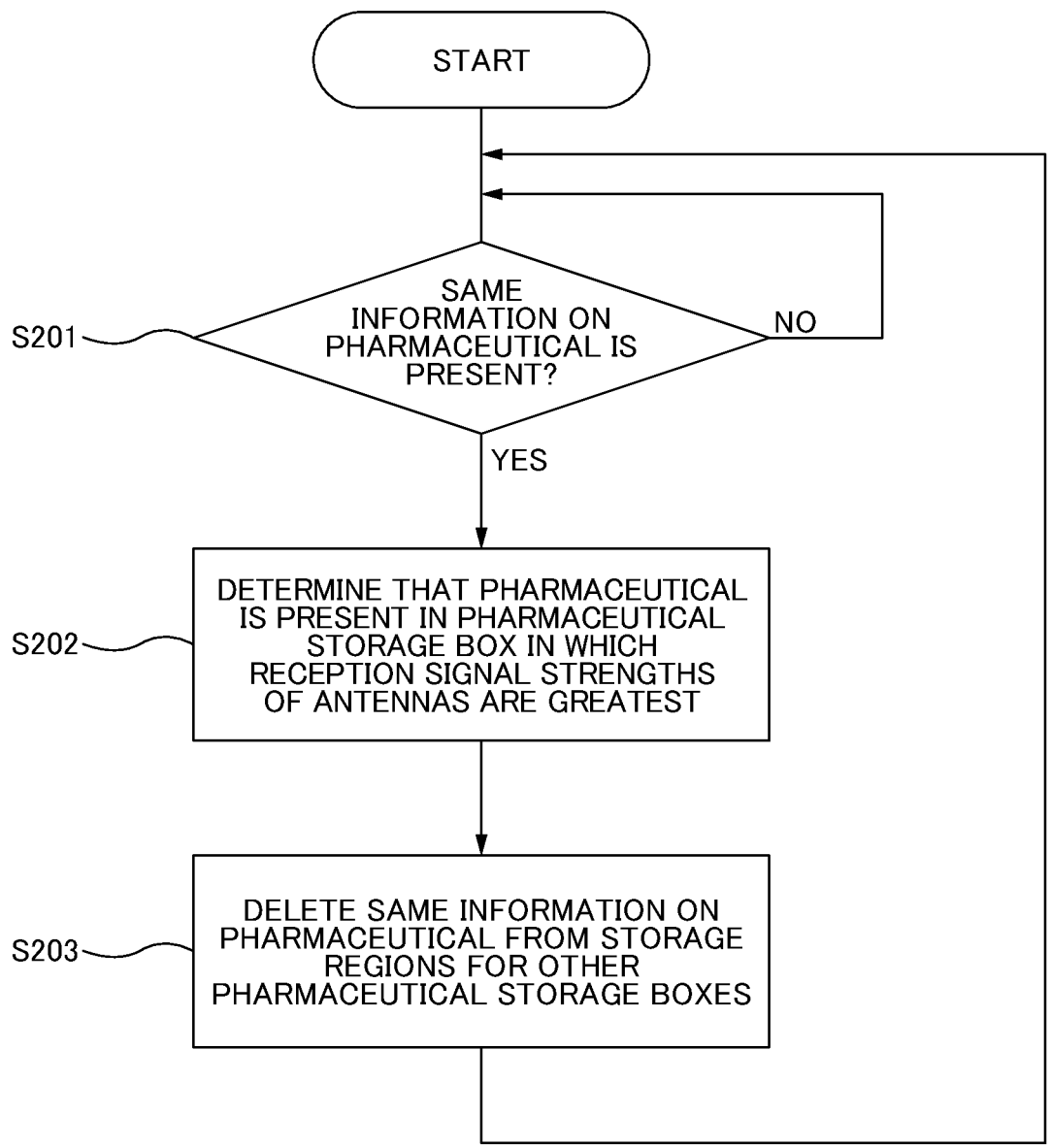
FIG. 14 is a flowchart for explaining an example of a determination operation of a controller in FIG. 13.

FIG. 14 is a flowchart for explaining an example of a determination operation of the controller in FIG. 13. The determination operation of the controller is implemented by causing the control unit 440 to operate according to the program read from the storage unit 450.

A radio wave emitted from each antenna 220 has such a directivity that the radio wave mainly travels in a direction of a broken line arrow (−X direction) from the side plate 212 toward the side plate 213 in the pharmaceutical storage box 200B. Accordingly, at the same time when the antenna 220 of the pharmaceutical storage box 200B on the right side of the drawing receives the ID information from the IC tag 300 attached to the pharmaceutical 310, the antennas 220 of the pharmaceutical storage boxes 200B on the left side and at the center of the drawing may erroneously receive the ID information from the same IC tag 300 although no pharmaceutical 310 is stored in the pharmaceutical storage boxes 200B on the left side or at the center of the drawing. In other words, the storage device 700 may erroneously store the same information as the information on the pharmaceutical 310 stored in the pharmaceutical storage box 200B on the right side of the drawing, into respective storage regions for the pharmaceutical storage boxes 200B on the left side and at the center of the drawing. Thus, when the storage device 700 erroneously stores the same information as the information on the pharmaceutical 310 stored in the pharmaceutical storage box 200B on the right side of the drawing into the respective storage regions for the pharmaceutical storage boxes 200B on the left side and at the center of the drawing, this information needs to be deleted.

Each pharmaceutical storage box 200B has the antenna 230 in addition to the antenna 220. A radio wave emitted from the antenna 230 has such a directivity that the radio wave travels mainly in a direction of a dashed-dotted line arrow (−Y direction) away from the back plate 214 in the pharmaceutical storage box 200B. In other words, there is a low possibility that the antennas 230 of the pharmaceutical storage box 200B on the left side and at the center of the drawing erroneously receive the ID information from the IC tag 300 of the pharmaceutical 310 stored in the pharmaceutical storage box 200B on the right side of the drawings. Accordingly, determination of the pharmaceutical storage box 200B storing the pharmaceutical 310 may be performed based on information indicating the reception signal strengths of the antennas 220, 230.

First, the controller 400 accesses the storage device 700 to refer to the respective storage regions for the three pharmaceutical storage boxes 200B, and determines whether the same information on the pharmaceutical 310 is stored or not, in other words, determines whether information of the same product code and the same put-in check time is stored or not (step S201).

For example, when information of the same product code and the same put-in check time is stored in the respective storage regions for the three pharmaceutical storage boxes 200B (step S201: YES), the controller 400 compares the reception signal strengths of the antennas 220, 230 among the three pharmaceutical storage boxes 200B, and determines that the pharmaceutical 310 is stored in the pharmaceutical storage box 200B on the right side of the drawing to which the antennas 220, 230 having the greatest reception signal strengths are attached (step S202). Note that, when information of the same product code and the same put-in check time is not stored in the respective storage regions for the three pharmaceutical storage boxes 200B (step S201: NO), the controller 400 executes the determination operation of the step S201 again.

Next, the controller 400 deletes the information that is stored in the respective storage regions for the pharmaceutical storage boxes 200B on the left side and at the center of the drawing and that is the same as the information on the pharmaceutical 310 stored in the pharmaceutical storage box 200B on the right side of the drawing, according to the determination result of the step S202 (step S203).

This enables correct management of the put-in information of the pharmaceutical 310.

<<Determination on Taking-out of Pharmaceutical>>

For example, assume a case where the pharmaceutical 310 to be taken out is taken out among multiple pharmaceuticals 310 stored in the pharmaceutical storage box 200. In this case, when a hand of a worker which is a dielectric is inserted between the antenna 220 (230) and the IC tag 300 of the pharmaceutical 310 that is not to be taken out, the radio wave emitted from the antenna 220 (230) does not sufficiently reach the IC tag 300 of the pharmaceutical 310 that is not to be taken out. As a result, the pharmaceutical 310 that is not to be taken out may be erroneously determined as the pharmaceutical 310 having been taken out although the pharmaceutical 310 is present in the pharmaceutical storage box 200. In addition, for example, when some of multiple pharmaceuticals 310 stored in the pharmaceutical storage box 200 are temporarily taken out of the pharmaceutical storage box 200 in order to change the arrangement of the multiple pharmaceuticals 310, the radio wave emitted from the antenna 220 (230) does not reach the IC tags 300 of the temporarily-taken-out pharmaceuticals 310. As a result, the temporarily-taken-out pharmaceuticals 310 may be erroneously determined as the pharmaceuticals 310 having been taken out although the pharmaceuticals 310 will be returned to the pharmaceutical storage box 200. Thus, it is needed to correctly determine a state in which the pharmaceutical 310 has been taken out.

First Example

Figure 15:
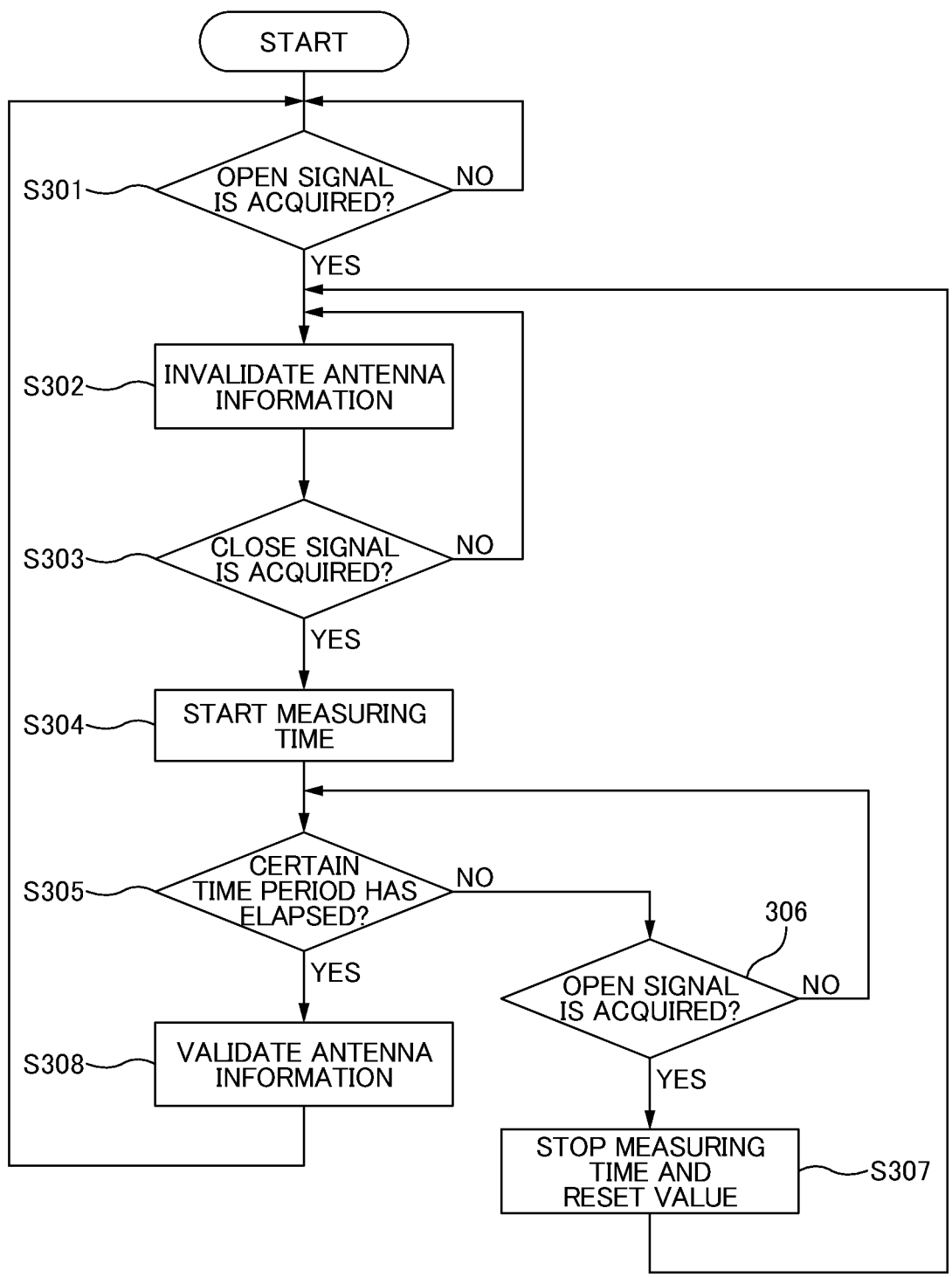
FIG. 15 is a flowchart for explaining an example of an operation of determining whether a pharmaceutical has been taken out of a pharmaceutical storage box or not in a pharmaceutical management system according to an embodiment of the present disclosure.

FIG. 15 is a flowchart for explaining an example of an operation of determining whether the pharmaceutical has been taken out of the pharmaceutical storage box or not in the pharmaceutical management system according to an embodiment of the present disclosure. The determination operation of the controller 400 is implemented by causing the control unit 440 to operate according to the program read from the storage unit 450. In addition, for the convenience of explanation, it is assumed that the controller 400 starts the determination operation with an initial state in which the door 140 of the pharmaceutical refrigerator 100 is closed.

First, the controller 400 acquires the open-close information of the door 140 from the door sensor 160 at regular time intervals. Specifically, the controller 400 acquires a close signal indicating that the door 140 is closed or an open signal indicating that the door 140 is open from the door sensor 160 at regular time intervals (for example, at intervals of five seconds). For example, assume a case where the door sensor 160 is configured using a microswitch. In this case, when the door 140 is closed, the microswitch is on, to thereby cause the door sensor 160 to output the close signal. When the door 140 is open, the microswitch is off, to thereby cause the door sensor 160 to output the open signal. Then, the controller 400 determines whether the open signal is acquired from the door sensor 160 or not (step S301).

When the controller 400 acquires no open signal from the door sensor 160 (step S301: NO), the controller 400 executes the determination operation of step S301 again. Meanwhile, when the controller 400 acquires the open signal from the door sensor 160 (step S301: YES), the controller 400 invalidates the information acquired from the antenna 220 (230), since there is a high possibility that whether the pharmaceutical 310 has been put in or taken out is uncertain in association with the door 140 being open. Specifically, the controller 400 invalidates the information of the antenna 220 (230) during a time period during which the door 140 is open, regardless of whether the controller 400 acquires new ID information from the antenna 220 (230) or no longer acquires the existing (already-acquired) ID information from the antenna 220 (230) (step S302).

Next, the controller 400 determines whether the close signal is acquired from the door sensor 160 or not (step S303). When the controller 400 acquires no close signal from the door sensor 160 (step S303: NO), the controller 400 executes the operation of step S302 and the determination operation of step S303 again. Meanwhile, when the controller 400 acquires the close signal from the door sensor 160 (step S303: YES), the controller 400 starts measuring time with respect to the current time as a reference using the clock unit 430 such that a time period elapsed from the closing of the door 140 can be grasped (step S304).

Next, the controller 400 determines whether a time period measured by the clock unit 430 reaches a certain time period (for example, five minutes) or not (step S305).

When the clock unit 430 has not measured the certain time period yet (step S305: NO), the controller 400 determines whether the open signal is acquired or not from the door sensor 160 while the clock unit 430 is measuring the certain time (step S306). When no open signal is acquired from the door sensor 160 (step S306: NO), the controller 400 executes the determination operation of step S305 again. Meanwhile, when the open signal is acquired from the door sensor 160 (step S306: YES), the controller 400 stops the operation of measuring time of the clock unit 430 and resets a measured time (step S307), and then executes step S302 again.

Meanwhile, when the clock unit 430 has measured the certain time period (step S305: YES), there is a high possibility that whether the pharmaceutical 310 has been put in or taken out is determined. Thus, the controller 400 validates the information acquired from the antenna 220 (230). Specifically, when the controller 400 acquires new ID information from the antenna 220 (230), the controller 400 determines that the corresponding pharmaceutical 310 has been put in. When the controller 400 no longer acquires existing ID information from the antenna 220 (230), the controller 400 determines that the corresponding pharmaceutical 310 has been taken out (step S308). The controller 400 then executes step S301 again.

This enables correct management of the put-in information and the take-out information of the pharmaceutical 310.

In addition, assume a case where the pharmaceutical storage box 200B (FIG. 5) is stored in the pharmaceutical refrigerator 100. In this case, the radio wave emitted from the antenna 230 attached to the back plate 214 has such a directivity that the radio wave travels mainly toward the glass window 141. Accordingly, when the pharmaceutical 310 is removed out of the pharmaceutical storage box 200B, to be taken out, and then is temporarily placed outside the pharmaceutical refrigerator 100 across the glass window 141, the antenna 230 may receive the ID information from the IC tag 300 attached to this pharmaceutical 310 and it may be erroneously determined that the pharmaceutical 310 has not been taken out. Accordingly, it is assumed that a sheet 142 that shields radio waves is attached to the glass window 141.

Second Example

Figure 16:
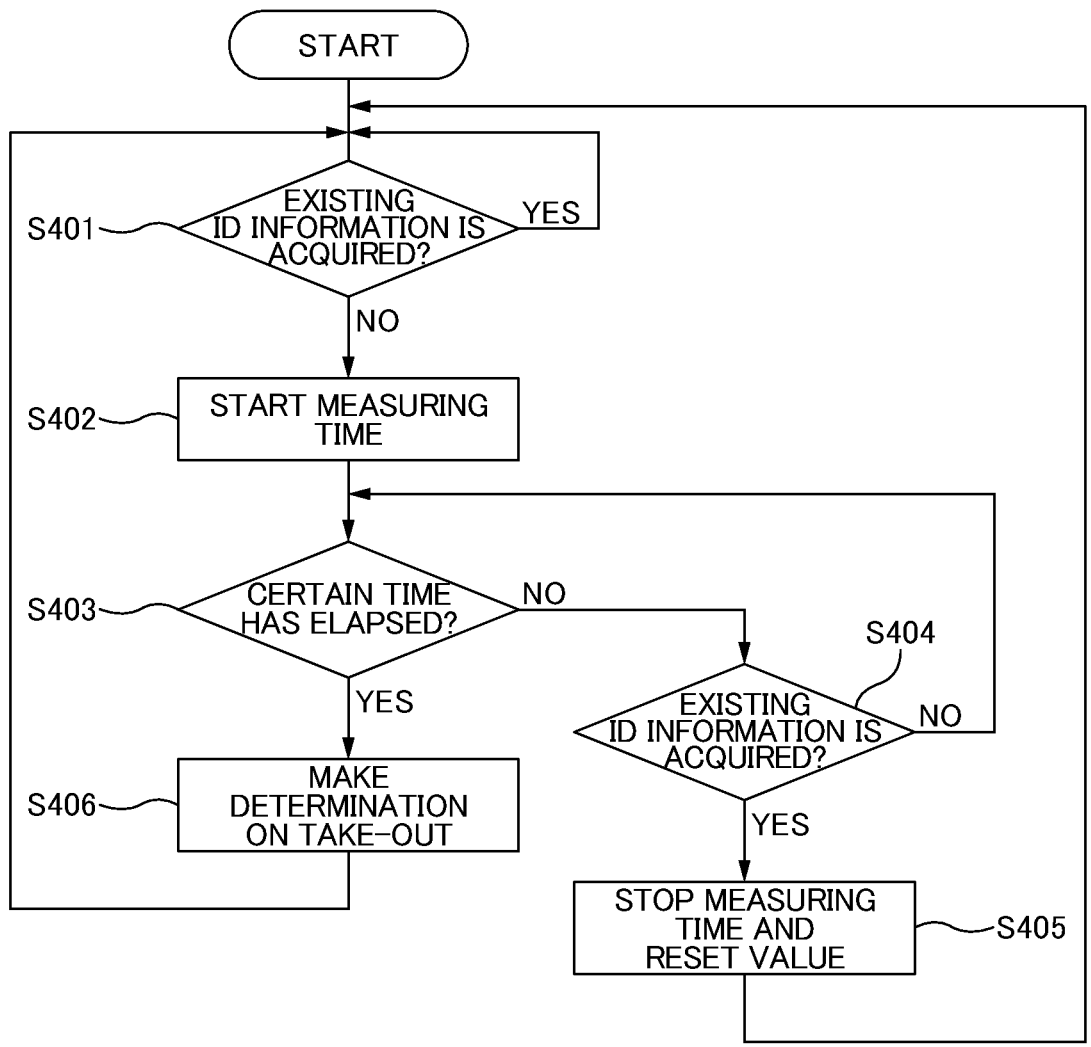
FIG. 16 is a flowchart for explaining another example of an operation of determining whether a pharmaceutical has been taken out of a pharmaceutical storage box or not in a pharmaceutical management system according to an embodiment of the present disclosure.

FIG. 16 is a flowchart for explaining another example of the operation of determining whether the pharmaceutical has been taken out of the pharmaceutical storage box or not in the pharmaceutical management system according to an embodiment of the present disclosure. The determination operation of the controller 400 is implemented by causing the control unit 440 to operate according to the program read from the storage unit 450.

First, the controller 400 determines whether the existing (already-acquired) ID information is no longer acquired from the antenna 220 (230) or not (step S401). When the controller 400 is continuously acquiring the existing ID information from the antenna 220 (230) (step S401: YES), the controller 400 executes the determination operation of step S401 again. Meanwhile, when the controller 400 no longer acquires the existing ID information from the antenna 220 (230) (step S401: NO), the controller 400 starts measuring time with respect to the current time as a reference using the clock unit 430 such that a time period elapsed from non-acquisition of the existing ID information can be grasped (S402).

Next, the controller 400 determines whether a time period measured by the clock unit 430 reaches a certain time period (for example, five minutes) or not (step S403).

When the clock unit 430 has not measured the certain time period yet (step S403: NO), the controller 400 determines whether the existing ID information is acquired or not while the clock unit 430 is measuring the certain time (step S404). When the controller 400 does not acquire the existing ID information (step S404: NO), the controller 400 executes the determination operation of step S403 again. Meanwhile, when the controller 400 acquires the existing ID information (step S404: YES), the controller 400 stops the operation of measuring time of the clock unit 430 to reset a measured time (step S405) and then executes the determination operation of step S401 again.

Meanwhile, when the clock unit 430 has measured the certain time period (step S403: YES), the controller 400 determines that the corresponding pharmaceutical 310 has been taken out (step S406) and then executes the determination operation of step S401 again.

This enables correct management of the take-out information of the pharmaceutical 310.

In the case where the pharmaceutical storage box 200B (FIG. 5) is stored in the pharmaceutical refrigerator 100, it is assumed that the sheet 142 that shields radio waves is attached to the glass window 141 as in the first example.

<<Display Example of Management Status of Pharmaceutical>>

FIG. 17 is a view illustrating an example of a management status of pharmaceuticals that is displayed on the display unit in the pharmaceutical management system according to an embodiment of the present disclosure. A display operation of the controller 400 is implemented by causing the control unit 440 to operate according the program read from the storage unit 450.

When the input unit 420 receives a display command for displaying the management status of pharmaceuticals 310 on the display unit 460, the controller 400 refers to the tables in the storage devices 500, 600, 700 as appropriate and displays visual information indicating a "put-in list", "pharmaceutical information", and a "put-in history" on the display unit 460.

The put-in list is visual information indicating the management statuses of all the pharmaceuticals 310 stored in the pharmaceutical refrigerator 100, and pieces of information indicating the product code, the pharmaceutical name, the expiration date, and the temperature, for example, are associated with one another for each of the pharmaceuticals 310.

In the put-in list, it is possible to display the pharmaceuticals 310 such that they are sorted according to any one of the product code, the pharmaceutical name, and the expiration date, or they are grouped based on the pharmaceutical storage boxes 200. In addition, it is possible to display the put-in list while updating it at regular time intervals (for example, five seconds). Furthermore, it is possible to display fields of expired pharmaceuticals 310 so as to be distinguishable (for example, high-lighted, blinking, and/or the like) from pharmaceuticals 310 that are not expired in the put-in list.

The pharmaceutical information is visual information indicating various pieces of information on the pharmaceutical 310 selected from the multiple pharmaceuticals 310 displayed in the put-in list, where, for example, the pharmaceutical name, the manufacturer code, the reception date, the expiration date, the lot number, and the image are associated with one another.

The put-in history is visual information indicating the put-in status of the pharmaceutical 310 selected from the multiple pharmaceuticals 310 displayed in the put-in list, where, for example, pieces of information indicating the put-in check time, the antenna code, the reception signal strength, and the temperature are associated with one another.

As such, pieces of information on the refrigeration temperature and the putting-in and taking-out of each pharmaceutical 310 are associated with one another and displayed on the display unit 460 as a list, which enables correct recognition of the management status of the pharmaceutical 310.

In addition, assume a case where the pharmaceutical management system 1 according to an embodiment of the present disclosure is constructed among the medical institution, the pharmaceutical wholesaler, and the pharmaceutical manufacturer. In this case, since the pieces of information on the refrigeration temperature and the putting-in and taking-out of each pharmaceutical 310 are managed while being associated with one another, a specialty pharmaceutical can be returned from the medical institution to the pharmaceutical wholesaler and the pharmaceutical manufacturer. This enables smooth distribution of pharmaceuticals including the specialty pharmaceutical.

<<Procedures of Putting-In and Taking-Out of Pharmaceuticals>>

Figure 18A:
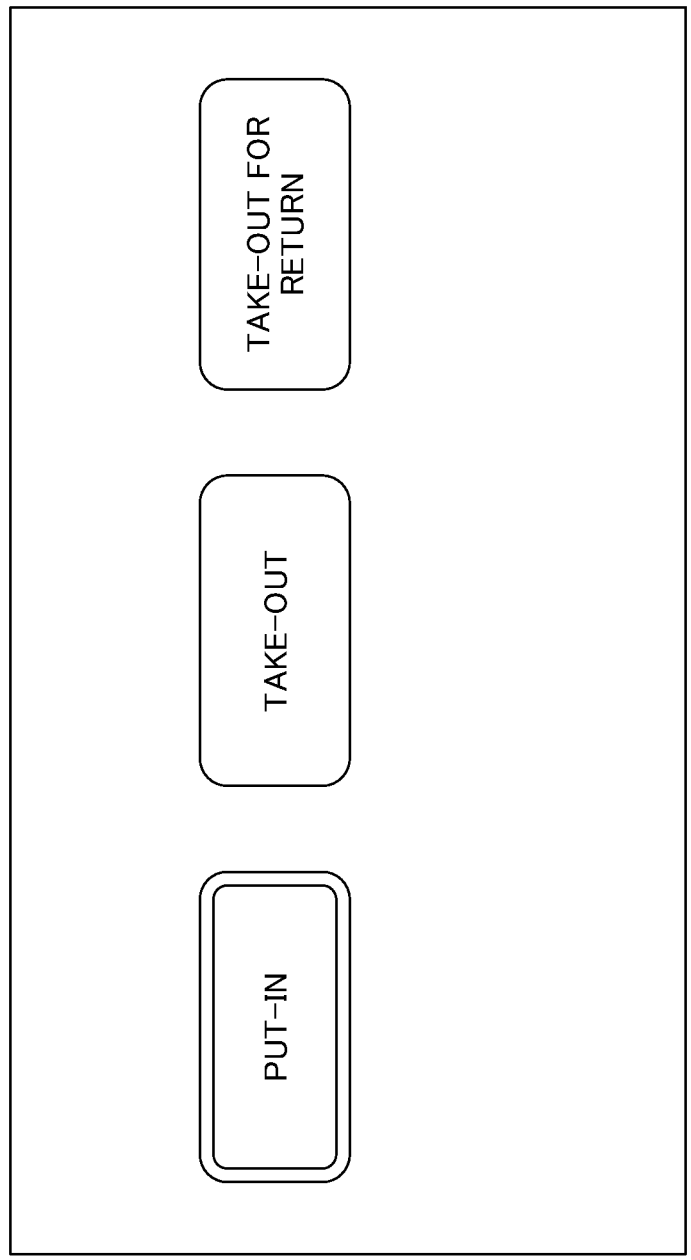
FIG. 18A is a view illustrating an example of a screen displayed on a display unit as a procedure for confirming putting-in of pharmaceuticals in one process in a pharmaceutical management system according to an embodiment of the present disclosure.
Figure 19A:
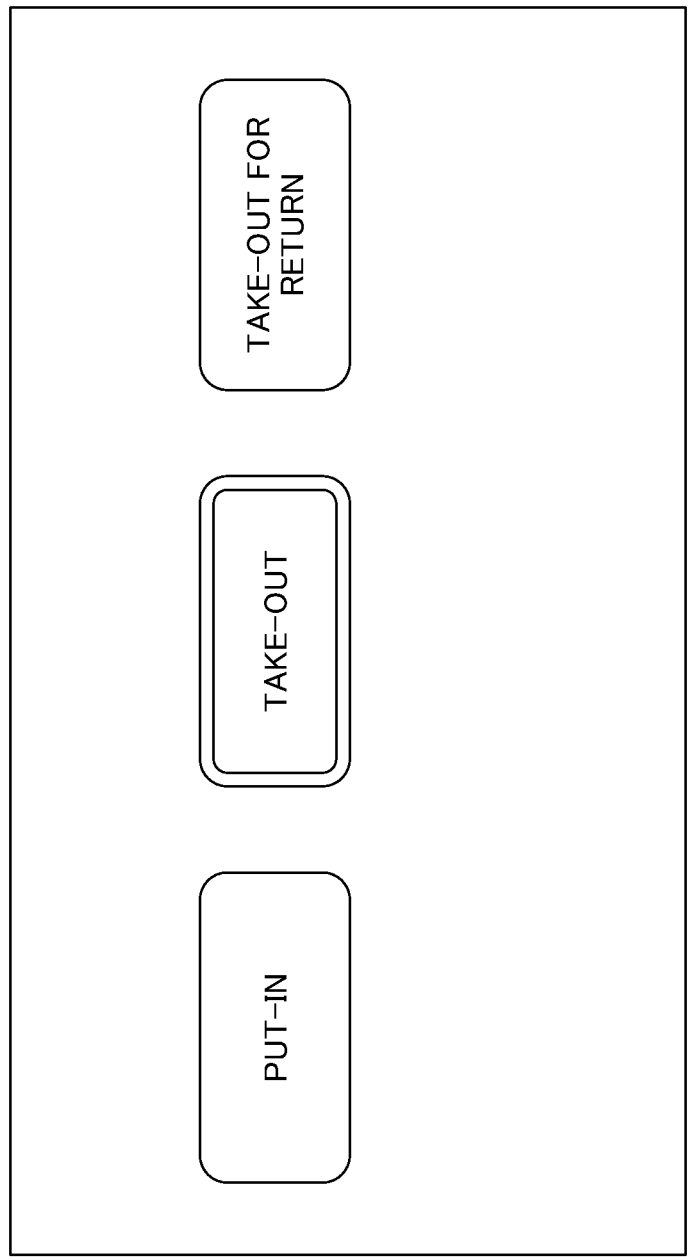
FIG. 19A is a view illustrating an example of a screen displayed on a display unit as a procedure for confirming taking-out of pharmaceuticals in one process in a pharmaceutical management system according to an embodiment of the present disclosure.
Figure 20A:
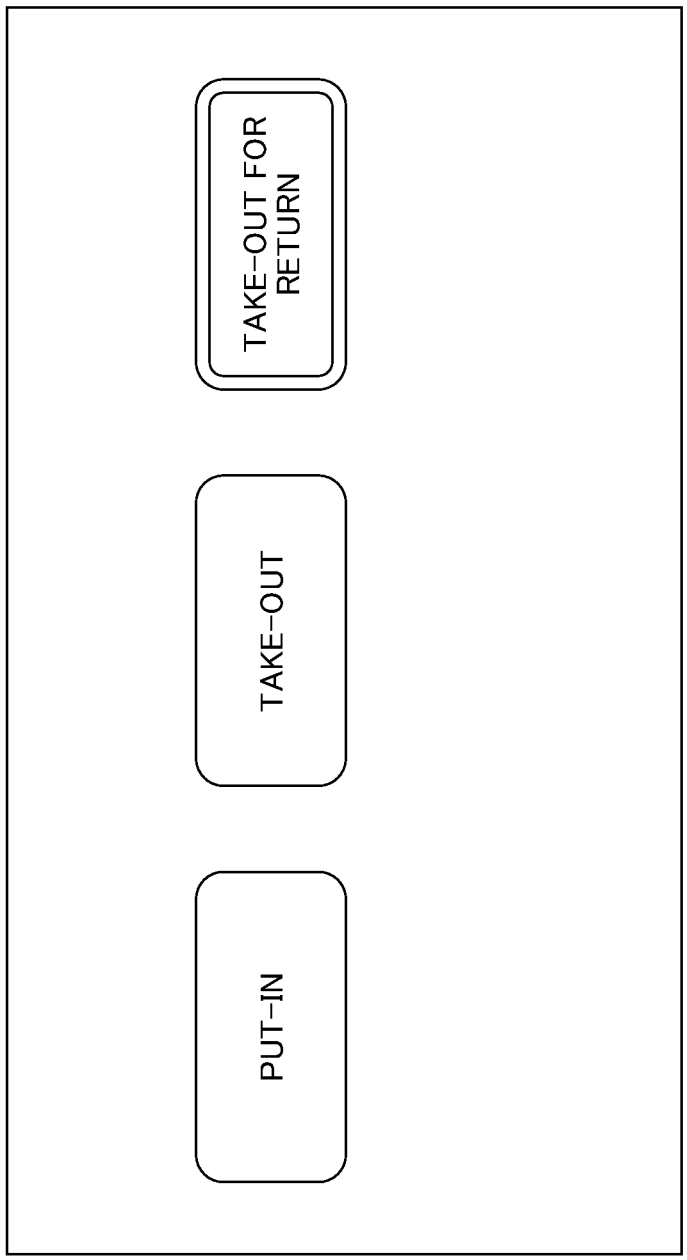
FIG. 20A is a view illustrating an example of a screen displayed on a display unit as a procedure for confirming taking-out for return of pharmaceuticals in one process in a pharmaceutical management system according to an embodiment of the present disclosure.

FIGS. 18A to 18C are views illustrating examples of screens displayed on the display unit as a procedure for confirming putting-in of the pharmaceuticals in one process. FIGS. 19A to 19C are views illustrating examples of screens displayed on the display unit as a procedure for confirming taking-out of the pharmaceuticals in one process. FIGS. 20A to 20C are views illustrating examples of screens displayed on the display unit as a procedure for confirming taking-out for return of the pharmaceuticals in one process. A display process of the display unit 460 is executed by causing the control unit 440 to operate according to the program read from the storage unit 450. In addition, it is assumed that the close signal of the door sensor 160 triggers determination of putting-in and taking-out of the pharmaceuticals 310 as illustrated in FIG. 16, for example.

<Put-In Process>

First, when a command for managing putting-in and taking-out of the pharmaceuticals 310 is input to the input unit 420, the controller 400 causes the display unit 460 to display a screen (FIG. 18A) for selecting one of "put-in", "take-out", and "take-out for return" of the pharmaceuticals 310.

Next, in response to a worker clicking a button of "put-in", the controller 400 causes the display unit 460 to display a put-in operation screen (FIG. 18B). In response to an instruction on the put-in operation screen, the worker opens the door 140 of the pharmaceutical refrigerator 100 to store all the pharmaceuticals 310 to be put into the pharmaceutical storage box 200 and then closes the door 140 of the pharmaceutical refrigerator 100.

Next, in response to acquisition of the close signal from the door sensor 160, the controller 400 acquires the ID information of the pharmaceuticals 310 from the antenna 220 (230). When the controller 400 acquires ID information of new pharmaceuticals 310 from the antenna 220 (230), the controller 400 causes a put-in operation screen (FIG. 18C) displaying pieces of information on the new pharmaceuticals 310 (items such as pharmaceutical name, manufacturing number, duration of use, and EPC code) in a list to be displayed. The worker checks that all the pharmaceuticals 310 to be put in are displayed in the list and clicks a button of "put-in confirmation". The controller 400 thereby stores, into the storage device 700, the information on all the pharmaceuticals 310 to be put in in one process. Accordingly, usability relating to confirmation process of the pharmaceuticals 310 to be put in is improved.

<Take-Out Process>

First, when a command for managing putting-in and taking-out of the pharmaceuticals 310 is input to the input unit 420, the controller 400 causes the display unit 460 to display a screen (FIG. 19A) for selecting one of "put-in", "take-out", and "take-out for return" of the pharmaceuticals 310.

Next, in response to the worker clicking a button of "take-out", the controller 400 causes the display unit 460 to display a take-out operation screen (FIG. 19B). In response to an instruction on the take-out operation screen, the worker opens the door 140 of the pharmaceutical refrigerator 100 to take all the pharmaceuticals 310 to be taken out, out of the pharmaceutical storage box 200, and then closes the door 140 of the pharmaceutical refrigerator 100.

Next, in response to acquisition of the close signal from the door sensor 160, the controller 400 acquires the ID information of the pharmaceuticals 310 from the antenna 220 (230). When the controller 400 no longer acquires the ID information of the existing pharmaceuticals 310 from the antenna 220 (230), the controller 400 causes a take-out operation screen (FIG. 19C) displaying pieces of information on the existing pharmaceuticals 310 (items such as pharmaceutical name, manufacturing number, duration of use, and EPC code) in a list to be displayed. The worker checks that all the pharmaceuticals 310 to be taken out are displayed in the list, and clicks a button of "take-out confirmation". The controller 400 thereby stores, into the storage device 700, the information on all the pharmaceuticals 310 to be taken out in one process. Accordingly, usability relating to confirmation process of the pharmaceuticals 310 to be taken out is improved.

<Take-Out-for-Return Process>

A take-out-for-return process is a process performed on the pharmaceuticals 310 to be returned among the aforementioned take-out processes, and a procedure for the take-out-for-return process is substantially the same as the aforementioned procedure for the take-out process.

First, when a command for managing putting-in and taking-out of the pharmaceuticals 310 is input to the input unit 420, the controller 400 causes the display unit 460 to display a screen (FIG. 20A) for selecting one of "put-in", "take-out", and "take-out for return" of the pharmaceuticals 310.

Next, in response to the worker clicking a button of "take-out for return", the controller 400 causes the display unit 460 to display a take-out-for-return operation screen (FIG. 20B). In response to an instruction on the take-out-for-return operation screen, the worker opens the door 140 of the pharmaceutical refrigerator 100 to take all the pharmaceuticals 310 to be taken out for return out of the pharmaceutical storage box 200, and then closes the door 140 of the pharmaceutical refrigerator 100.

Next, in response to acquisition of the close signal from the door sensor 160, the controller 400 acquires the ID information of the pharmaceuticals 310 from the antenna 220 (230). When the controller 400 no longer acquires the ID information of the existing pharmaceuticals 310 from the antenna 220 (230), the controller 400 causes a take-out-for-return operation screen (FIG. 20C) displaying pieces of information on the existing pharmaceuticals 310 (items such as pharmaceutical name, manufacturing number, duration of use, and EPC code) in a list to be displayed. The worker checks that all the pharmaceuticals 310 to be taken out for return are displayed in the list, and clicks a button of "take-out-for-return confirmation". The controller 400 thereby stores, into the storage device 700, the information on all the pharmaceuticals 310 to be taken out for return in one process. Accordingly, usability relating to confirmation process of the pharmaceuticals 310 to be taken out for return is improved.

Embodiments of the present disclosure described above are simply to facilitate understanding of the present disclosure and are not in any way to be construed as limiting the present disclosure. The present disclosure may variously be changed or altered without departing from its essential features and encompass equivalents thereof. For example, the IC tag 300 may be a tag into and from which data can be written and read so as to enable correction and update of information on the pharmaceutical 310 in response to an instruction from the controller 400.

What is claimed is:

1. A pharmaceutical management system comprising:
    an IC tag attached to a pharmaceutical;
    a pharmaceutical storage box to store the pharmaceutical and read information of the IC tag;
    a controller to acquire the information of the IC tag from the pharmaceutical storage box and manage the pharmaceutical; and
    a pharmaceutical refrigerator to store the pharmaceutical storage box to refrigerate the pharmaceutical, wherein:
    the pharmaceutical refrigerator includes a plurality of shelves on which the pharmaceutical storage box is placed,
    the pharmaceutical storage box includes an antenna configured to receive the information of the IC tag,
    the pharmaceutical storage box includes a bottom plate on which the pharmaceutical is placed, and the bottom plate includes a plurality of ventilation holes,
    the pharmaceutical storage box includes a plurality of pharmaceutical storage boxes,
    the plurality of pharmaceutical storage boxes each includes a storage portion to store the pharmaceutical, the storage portion including a first side plate and a second side plate facing the first side plate,
    the antenna is attached to the second side plate so as to emit a radio wave toward the first side plate, the pharmaceutical refrigerator stores the plurality of pharmaceutical storage boxes such that the first side plate of one of the plurality of pharmaceutical storage boxes is adjacent to the second side plate of another one of the pharmaceutical storage boxes, and when the controller acquires the information of the same IC tag simultaneously from more than one of the plurality of pharmaceutical storage boxes, the controller determines that the pharmaceutical having the IC tag is stored in the pharmaceutical storage box located most downstream in a direction in which the antennas emit the radio wave.

2. A pharmaceutical management system comprising:

an IC tag attached to a pharmaceutical;

a pharmaceutical storage box to store the pharmaceutical and read information of the IC tag;

a controller to acquire the information of the IC tag from the pharmaceutical storage box and manage the pharmaceutical; and a pharmaceutical refrigerator to store the pharmaceutical storage box to refrigerate the pharmaceutical, wherein:

the pharmaceutical refrigerator includes a plurality of shelves on which the pharmaceutical storage box is placed, the pharmaceutical storage box includes an antenna configured to receive the information of the IC tag, the pharmaceutical storage box includes a bottom plate on which the pharmaceutical is placed, and the bottom plate includes a plurality of ventilation holes, the pharmaceutical storage box includes a plurality of pharmaceutical storage boxes, the pharmaceutical refrigerator stores the plurality of pharmaceutical storage boxes, the plurality of pharmaceutical storage boxes each include a storage portion to store the pharmaceutical, a plurality of antennas are attached to a plurality of flat plates defining the storage portion, each of the plurality of antennas corresponding to the antenna configured to receive the information of the IC tag, and the controller acquires the information of the IC tag from the plurality of antennas in each of the plurality of pharmaceutical storage boxes stored in the pharmaceutical refrigerator and, when the controller acquires the information of the same IC tag simultaneously from more than one of the plurality of pharmaceutical storage boxes, identifies the pharmaceutical storage box actually storing the pharmaceutical having the IC tag.

3. A pharmaceutical management system comprising:

an IC tag attached to a pharmaceutical;

a pharmaceutical storage box to store the pharmaceutical and read information of the IC tag;

a controller to acquire the information of the IC tag from the pharmaceutical storage box and manage the pharmaceutical; and a pharmaceutical refrigerator to store the pharmaceutical storage box to refrigerate the pharmaceutical, wherein:

the pharmaceutical refrigerator includes a plurality of shelves on which the pharmaceutical storage box is placed, the pharmaceutical storage box includes an antenna configured to receive the information of the IC tag, the pharmaceutical storage box includes a bottom plate on which the pharmaceutical is placed, and the bottom plate includes a plurality of ventilation holes, the pharmaceutical storage box includes:

a storage portion to store the pharmaceutical; and a plurality of antennas attached to a plurality of flat plates defining the storage portion, each of the plurality of antennas corresponding to the antenna configured to receive the information of the IC tag, the pharmaceutical storage box includes a plurality of pharmaceutical storage boxes, the pharmaceutical refrigerator stores the plurality of pharmaceutical storage boxes, and when the controller acquires the information of the same IC tag simultaneously from more than one of the plurality of pharmaceutical storage boxes, the controller identifies a plurality of antennas that receive the information of the IC tag having greatest reception signal strength among the plurality of antennas, and determines that the pharmaceutical having the IC tag is stored in the pharmaceutical storage box to which the identified plurality of antennas are attached.

4. The pharmaceutical management system according to claim 2, wherein the pharmaceutical storage box further includes a coupling device to couple the plurality of antennas to the controller.

5. A pharmaceutical management system comprising:

an IC tag attached to a pharmaceutical;

a pharmaceutical storage box to store the pharmaceutical and read information of the IC tag;

a controller to acquire the information of the IC tag from the pharmaceutical storage box and manage the pharmaceutical; and a pharmaceutical refrigerator to store the pharmaceutical storage box to refrigerate the pharmaceutical, wherein:

the pharmaceutical refrigerator includes a plurality of shelves on which the pharmaceutical storage box is placed, the pharmaceutical storage box includes an antenna configured to receive the information of the IC tag, the pharmaceutical storage box includes a bottom plate on which the pharmaceutical is placed, and the bottom plate includes a plurality of ventilation holes, the antenna is attached so as to emit a radio wave in a direction toward a front glass of the pharmaceutical refrigerator, and a sheet that shields a radio wave is attached to the front glass.

6. The pharmaceutical management system according to claim 2, wherein one of the plurality of antennas is attached so as to emit a radio wave in a direction toward a front glass of the pharmaceutical refrigerator, and a sheet that shields a radio wave is attached to the front glass.

* * * * *